(12) United States Patent
Moore et al.

(10) Patent No.: US 12,545,400 B2
(45) Date of Patent: Feb. 10, 2026

(54) PARALLEL AND SERIES MULTI-STAGE ELECTRIC FAN

(71) Applicant: Whisper Aero Inc., Crossville, TN (US)

(72) Inventors: Mark Douglass Moore, Crossville, TN (US); Devon Jedamski, Nashville, TN (US); Ian Andreas Villa, Nashville, TN (US); Vineet Ahuja, Fort Washington, PA (US); Andrew Stephen Hahn, Yorktown, VA (US)

(73) Assignee: Whisper Aero Inc., Crossville, TN (US)

(*) Notice: Subject to any disclaimer, the term of this patent is extended or adjusted under 35 U.S.C. 154(b) by 0 days.

(21) Appl. No.: 18/737,666

(22) Filed: Jun. 7, 2024

(65) Prior Publication Data

US 2024/0409209 A1    Dec. 12, 2024

Related U.S. Application Data

(60) Provisional application No. 63/472,210, filed on Jun. 9, 2023.

(51) Int. Cl.
*G05D 1/652* (2024.01)
*B64C 29/00* (2006.01)
(Continued)

(52) U.S. Cl.
CPC ......... *B64C 29/0033* (2013.01); *G05D 1/652* (2024.01); *G05D 1/6545* (2024.01); *G05D 2109/23* (2024.01)

(58) Field of Classification Search
CPC .. G05D 1/652; G05D 1/6545; G05D 2109/23; G05D 2109/24; B64U 10/10;
(Continued)

(56) References Cited

U.S. PATENT DOCUMENTS 3,383,075 A * 5/1968 Chichester-Miles ........................ B64C 29/0075
244/54
3,488,018 A * 1/1970 Johnson ............... B64C 29/0033
244/12.4

(Continued)

FOREIGN PATENT DOCUMENTS

CN      105460215 A      4/2016
DE  102021004552 A1 *  3/2023 ............. B64D 27/34
(Continued)

OTHER PUBLICATIONS

Sep. 17, 2024—(WO) International Search Report and Written Opinion—App PCT/US2024/033104.

*Primary Examiner* — Joshua E Rodden
(74) *Attorney, Agent, or Firm* — Banner & Witcoff, Ltd.

(57) ABSTRACT

Aspects described herein may relate to aerial structures such as aircraft. An aerial structure may include a fuselage, a wing attached to the fuselage, and a plurality of propulsion systems configured to generate thrust. A propulsion system may include a plurality of propulsors, such as propulsor fans. A propulsor fan may be configured to be actuated between a conventional take-off and landing (CTOL) flight mode, a short take-off and landing (STOL) flight mode, and a vertical take-off and landing (VTOL) flight mode.

7 Claims, 36 Drawing Sheets

(51) Int. Cl.
*G05D 1/654* (2024.01)
*G05D 109/22* (2024.01)

(58) Field of Classification Search
CPC ........ B64U 10/20; B64U 70/80; B64D 27/31;
B64D 27/32; B64C 29/00; B64C
29/0008; B64C 29/0016; B64C 29/0033;
B64C 29/0041; B64C 29/0058; B64C
29/0066; B64C 29/0075; B64C 29/0083;
B64C 29/0091; B64C 29/02; B64C 29/04
USPC ....................................................... 244/75.1
See application file for complete search history.

(56) References Cited

U.S. PATENT DOCUMENTS

| | | | |
|---|---|---|---|
| 11,247,783 B1* | 2/2022 | Jeng ........................... | B64C 3/18 |
| 2011/0001001 A1* | 1/2011 | Bryant .................... | B64U 50/19 |
| | | | 244/12.5 |
| 2012/0298789 A1* | 11/2012 | Oz .......................... | B64C 15/12 |
| | | | 244/12.4 |
| 2016/0023754 A1* | 1/2016 | Wiegand ................ | B64D 27/32 |
| | | | 244/17.11 |
| 2022/0258859 A1 | 8/2022 | Bianco Mengotti | |
| 2023/0202652 A1* | 6/2023 | Convert .................. | B64C 39/08 |
| | | | 244/7 R |

FOREIGN PATENT DOCUMENTS

| | | |
|---|---|---|
| GB | 935715 A | 9/1963 |
| GB | 1151372 A | 5/1969 |
| WO | 2021010915 A1 | 1/2021 |

* cited by examiner

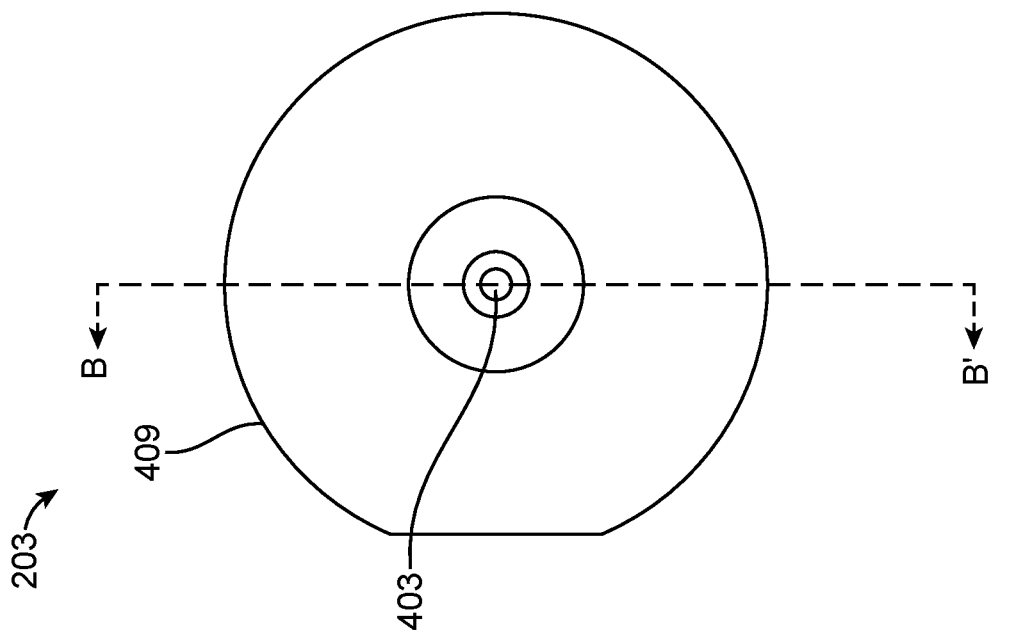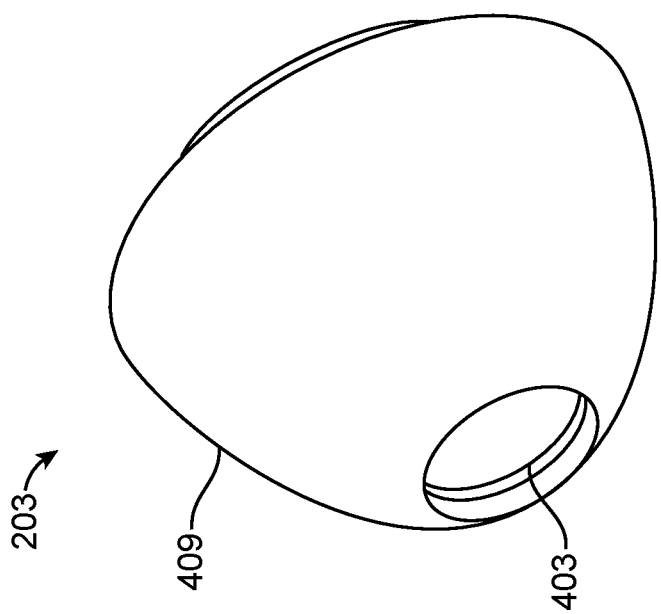
FIG. 4B
FIG. 4A

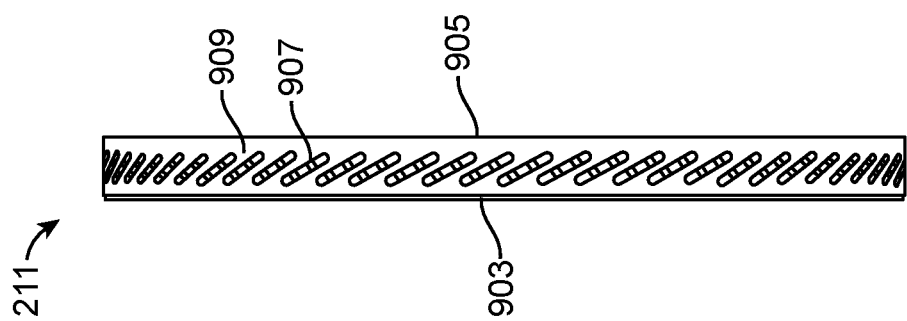
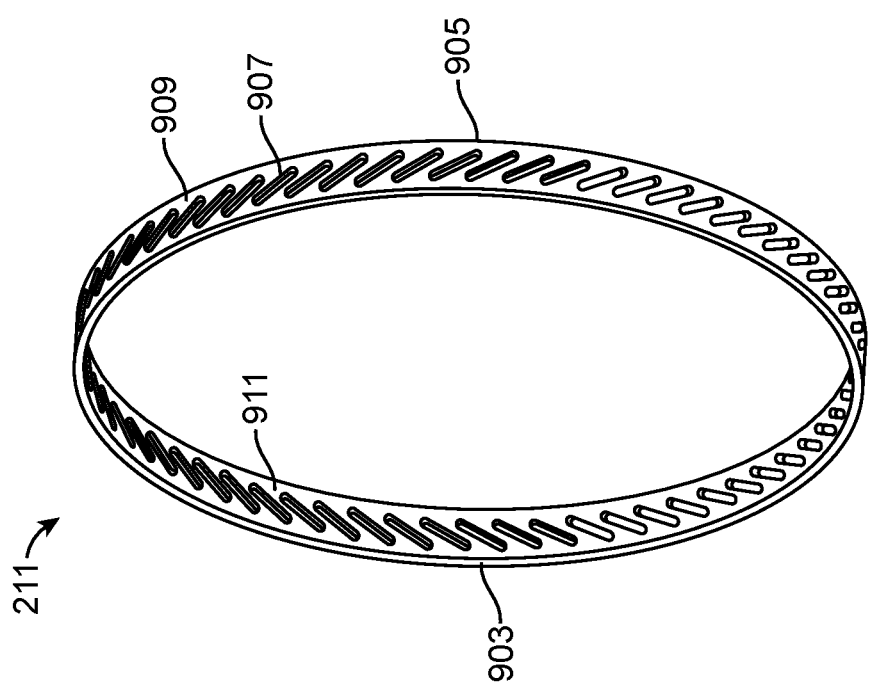

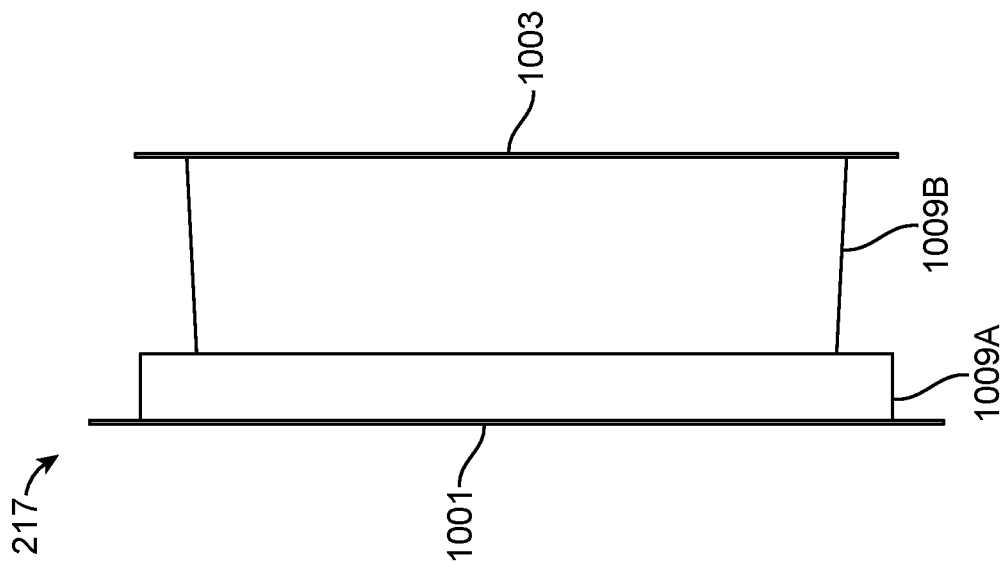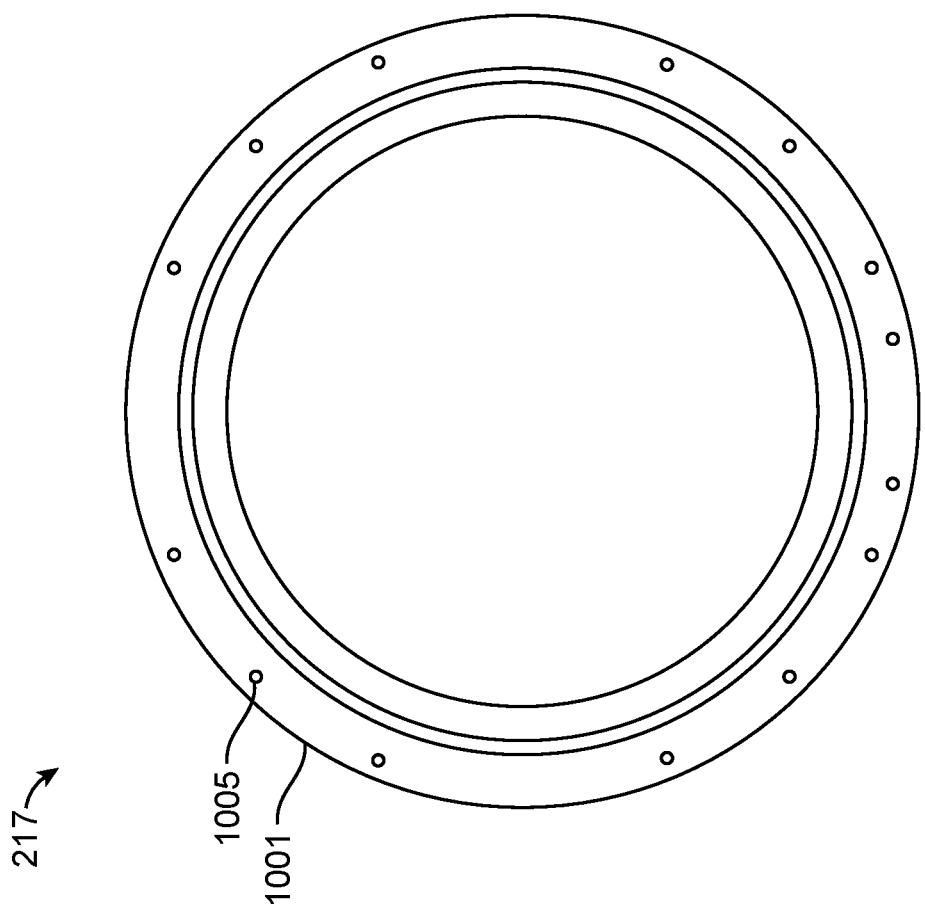

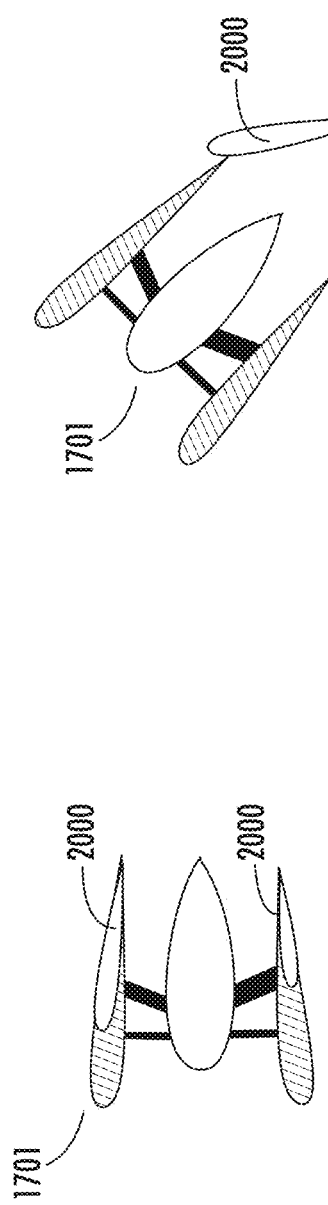
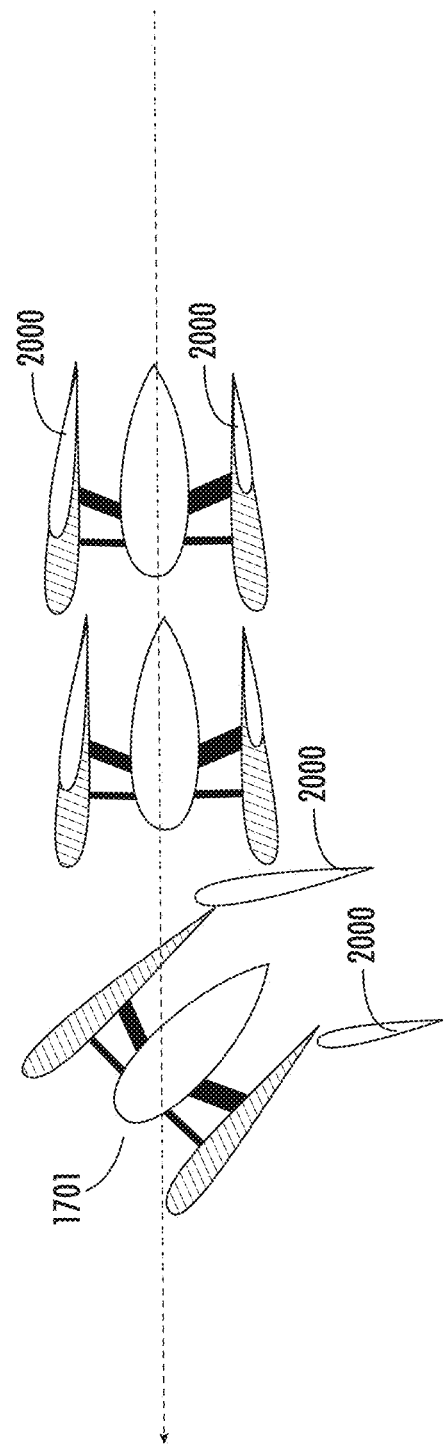

PARALLEL AND SERIES MULTI-STAGE ELECTRIC FAN

CROSS REFERENCE TO RELATED APPLICATION

This application claims priority to U.S. Provisional Patent Application No. 63/472,210 entitled "Parallel and Series Multi-Stage Electric Fan" and filed on Jun. 9, 2023, which is incorporated by reference in its entirety herein for any and all non-limiting purposes.

TECHNICAL FIELD

The present disclosure generally relates to a propulsor fan and drive system, and more particularly to articulating a series of propulsor fans that are configured to orient in different positions for different flight operations or modes such as, for example, conventional takeoff and landing (CTOL) flight operations, short takeoff and landing (STOL) flight operations, vertical takeoff and landing (VTOL) flight operations, and vertical and/or short takeoff and landing (V/STOL) operations.

BACKGROUND

In order to achieve 1% improvement in propulsive efficiency of an aircraft flying at 450 knots during CTOL flight operations, the fan diameter of a fan for the aircraft propulsor must often increase by 10%. The increased fan diameter, however, results in increased duct drag which negates the benefit of the improved propulsive efficiency. The same diameter increase also reduces the power required per pound of thrust to allow the aircraft to hover by 9% during VTOL flight operations. These two disparate conditions make a multi-modal propulsion system that is capable of adapting to the needs of different flight operations or modes of the aircraft difficult.

Accordingly, described herein may address one or more problems of improving and adapting aircraft propulsion system capabilities to conduct multi-mode flight operations such as CTOL and V/STOL flight operations. aspects of this disclosure address the above and/or other needs in the art.

SUMMARY

The following presents a simplified summary of various aspects described herein. This summary is not an extensive overview and is not intended to identify key or critical elements or to delineate the scope of any claim. The following summary merely presents some concepts in a simplified form as an introductory prelude to the more detailed description provided below.

Aspects relate to systems that may include a series of commonly or independently actuated propulsor fans configured to adapt to and optimize CTOL, STOL, VTOL, and V/STOL flight operations. For example, an aircraft may include a series of propulsors arranged in a linear fashion, and the series of propulsors may be configured such that the exhaust of a first propulsor may feed the inlet of a second propulsor positioned aft of the first propulsor, which may increase the pressure of the exhaust flow. Additionally, the first propulsor and the second propulsor may articulate to optimize air flowing into the propulsor inlets and to optimize exhaust flow of the propulsors when transitioning between CTOL and V/STOL flight modes. Some embodiments described herein may include an aircraft having a fuselage, a wing, and/or a boom. In some examples, propulsion systems may be attached to the fuselage, wing, or boom. As another example, the propulsion systems may include a row or a series of thrust-generating propulsor fans extending linearly along a length of the fuselage, and the thrust-producing propulsor fans may be configured to rotate between at least two of a conventional take-off and landing flight mode, a short take-off and landing flight mode, and a vertical take-off and a landing flight mode.

Some aspects described herein may include a series of (e.g., four) thrust-generating propulsors attached to a forward-left portion of an aircraft fuselage with another series of (e.g., four) thrust-generating propulsors attached to a forward-right portion of the fuselage. An additional series of (e.g., four) thrust-generating propulsors may be attached to an aft-left portion of the fuselage with another series of (e.g., four) thrust-generating propulsors attached to an aft-right portion of the fuselage. The thrust-generating propulsors attached to the aft-portion of the fuselage may be vertically offset or positioned above the thrust-generating propulsors attached to the forward portion of the fuselage. Each of the four thrust-generating propulsors may be linearly aligned with each other in a CTOL flight mode. As an example, the exhaust of three of the four thrust-generating propulsors may be inserted into or aligned with an inlet of the three aft-most thrust-generating propulsors in a CTOL flight mode. As another example, during the STOL flight mode and the VTOL flight mode, no exhaust of any thrust-generating propulsors is aligned with any inlet of the thrust-generating propulsors. By aligning the thrust-generating propulsors during the CTOL flight mode, the mass flow of the thrust-generating propulsors is increased resulting in the advantage of great performance and speed. Similarly, by preventing exhaust from the thrust-generating propulsors from entering the inlets of the thrust-generating propulsors during STOL and VTOL flight operations, air is not disturbed prior to entering the thrust-generating propulsor inlets improving overall performance in STOL and VTOL flight operations.

The thrust-generating propulsor fans may include extendable flaps that improve aircraft performance in V/STOL flight modes. As an example, a thrust-generating propulsor fan with extendable flaps that are configured to extend only when physically clear of the inlet of another aft positioned thrust-generating propulsor fan.

A thrust-generating propulsor fan may include a scarf inlet having slats configured deploy or extend to an open position to increase air intake in V/STOL flight modes. The extendable slats of the thrust-generating propulsor fans may also be configured to deploy to the open position when the thrust-generating propulsor fan has rotated to a position in which the slats are physically clear of the extendable flaps of a forward thrust-generating propulsor fan.

Aircraft having the capability to transition between CTOL and V/STOL flight modes has previously been achieved by using conventional gas turbines, turbofans, and/or tilt-rotor configurations. These aircraft, however, have weight issues and are extremely complicated due to required mechanical components related to conventional propulsion systems. As such, these conventional aircraft have many undesirable qualities to include reduced payload capabilities, decreased range, small flight envelopes, increased safety concerns, and increased maintenance workloads. The propulsion systems described herein and, in particular, aircraft configured with an articulating series of thrust-producing propulsor fans have a reduced overall weight and have simplified design characteristics to advantageously facilitate flight operations in a CTOL configuration, a STOL configuration, and a VTOL configuration.

These features, along with many others, are discussed by way of example in greater detail below. Corresponding systems and methods are also within the scope of the disclosure.

BRIEF DESCRIPTION OF THE DRAWINGS

The present disclosure is illustrated by way of example and not limited in the accompanying figures in which like reference numerals indicate similar elements and in which:

FIGS. 4A, 4B, 4C, and 4D respectively illustrate a perspective view, a front view, a cross-section view, and a perspective view of the cross-section of a nose cone of the propulsor fan according to one example as described herein.

FIGS. 9A and 9B respectively illustrate a perspective view and a side view of a tension ring of the propulsor fan according to one example as described herein.

FIGS. 10A, 10B, and 10C respectively illustrate a perspective view, a front view, and a side view of an inner duct body housing of the propulsor fan according to one example as described herein.

FIGS. 20A, 20B, and 20C illustrate variable outlet of a propulsor or series of propulsors according to one example as described herein.

DETAILED DESCRIPTION

In the following description, reference is made to the accompanying drawings, which form a part hereof, and in which is shown by way of illustration various examples in which the disclosure may be practiced. It is to be understood that other examples may be utilized and implemented whereby structural and functional modifications may be made without departing from the scope and spirit of the present disclosure. Further, headings within this disclosure should not be considered as limiting aspects of the disclosure. Those skilled in the art with the benefit of this disclosure will appreciate that the examples are not limited to the headings.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The terms "STOL" and "VTOL" may be used interchangeably with "V/STOL." The terms "tail cone" and "outlet" and "exhaust" and "nozzle" may also be used interchangeably.

By way of introduction, aspects discussed herein may relate to aircraft systems and methods to power and control multi-mode flight operations such as CTOL, STOL, VTOL, or V/STOL flight operations. In particular, multiple electric propulsor fans may be used to power an aircraft, and the propulsor fans may include the capability to articulate into various positions to redirect thrust such that the aircraft may conduct CTOL, STOL, VTOL, and V/STOL flight operations more efficiently and effectively than prior systems and methods.

Propulsor Fan and Drive System

In one example, a propulsor fan and drive system is described herein. Generally, the propulsor fan and drive system are configured to generate thrust.

Figure 1:
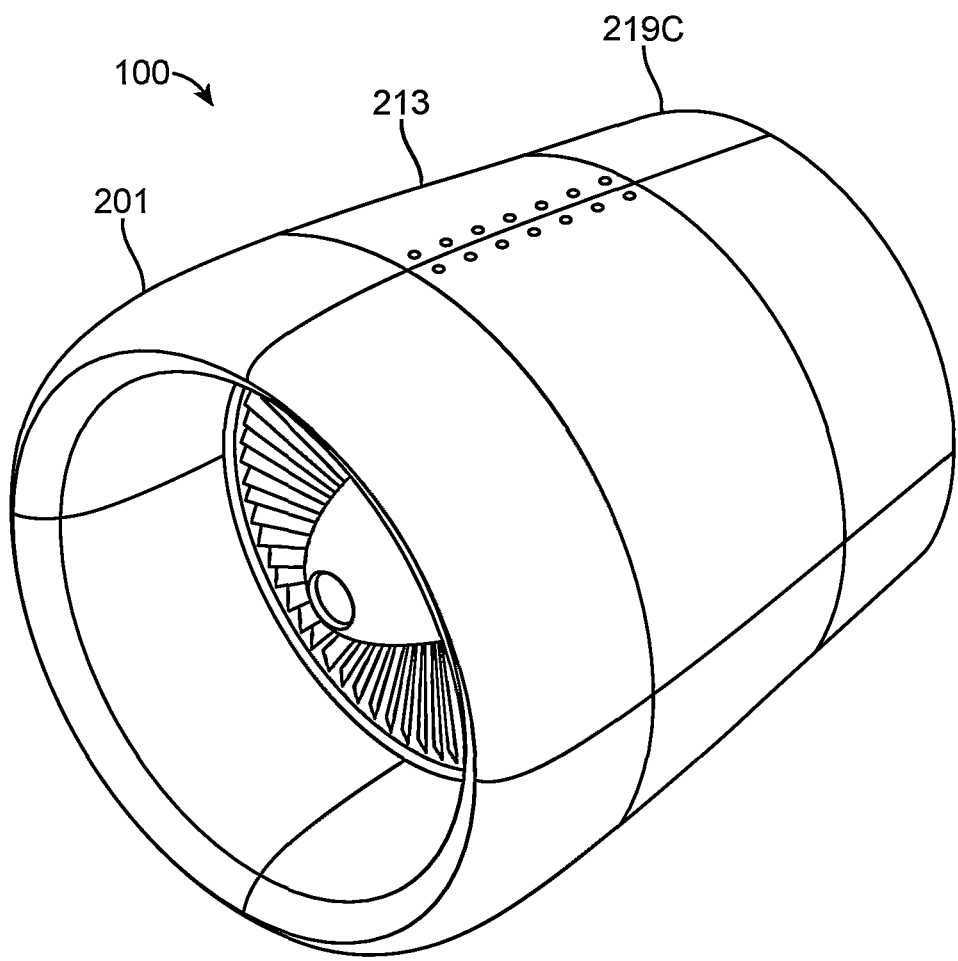
FIG. 1 is a perspective view of a propulsor fan according to one example as described herein.

FIG. 1 illustrates a perspective view of a propulsor fan 100 according to one example. Generally, the propulsor fan 100 may include a plurality of components that collectively reduce noise emitted by the propulsor fan 100 during thrust generation. Thus, the propulsor fan 100 reduces noise pollution. Moreover, the reduction in noise provides a tactical advantage to reduce detectability in a hostile environment. Propulsor fan 100 may include a tensioned blade fan or bladed disk that may include a plurality of fan blades. By tensioning the blade fan, the angle of the fan blades is maintained to be substantially the same whether the propulsor fan is generating maximum thrust or is not operating (e.g., is at rest). As a result, noise pollution is reduced and thrust efficiency is increased compared to conventional propulsor fans. The propulsor fan 100 reduces noise pollution given that the angle of the fan blades is maintained within a predetermined tolerance range. For example, the propulsor fan 100 emits noise that is less than 65 dBA at 300 feet sideline/5,000 lbf. Propulsor fan 100 may also include may include duct lip or scarf inlet 201, outer casing 213, and stator outer portion 219. Outer casing 213 may be a single component or a series of sections/components forming outer casing 213.

Figure 2A:
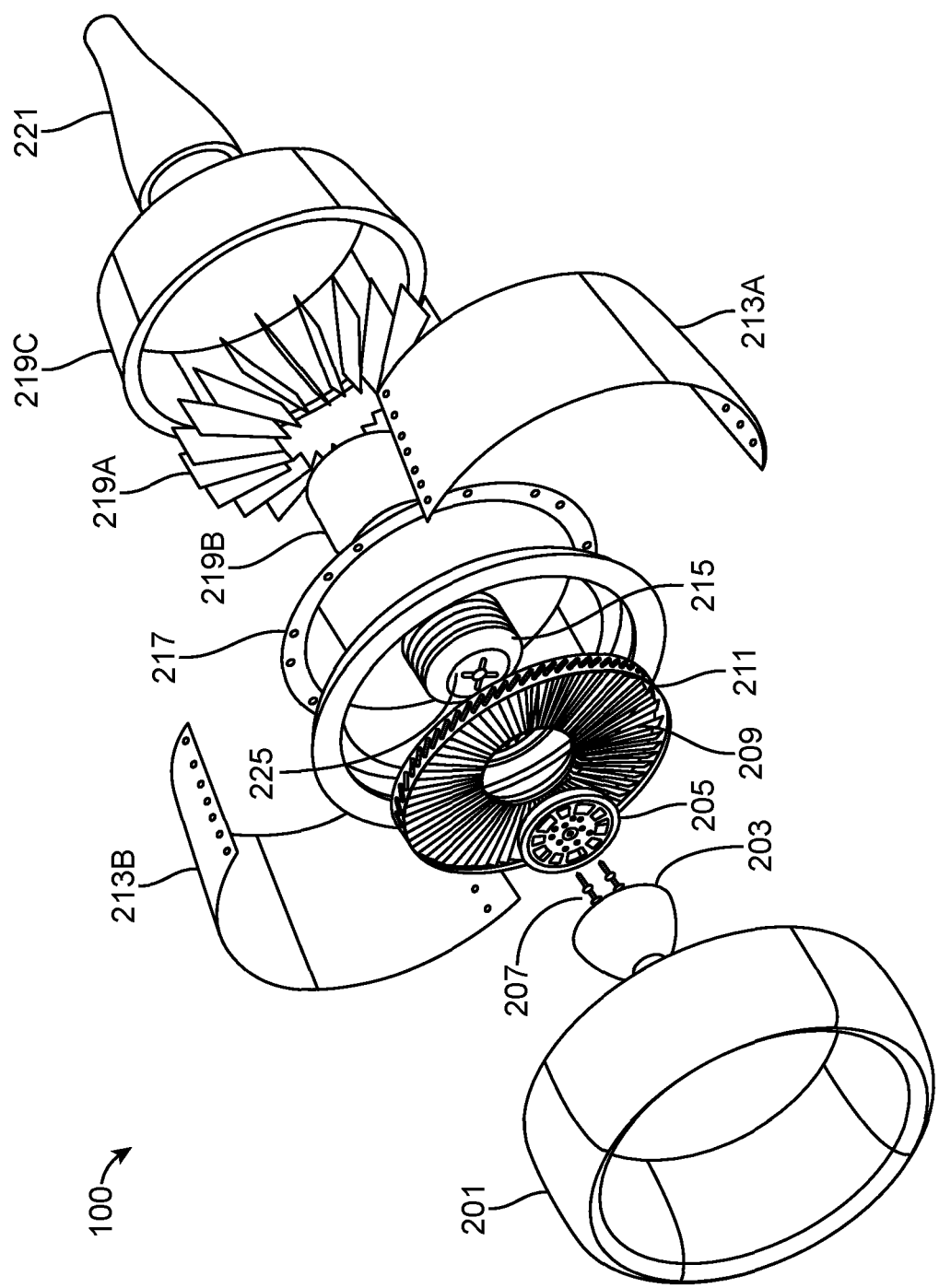
FIG. 2A is a first exploded view of the propulsor fan according to one example as described herein.
Figure 2B:
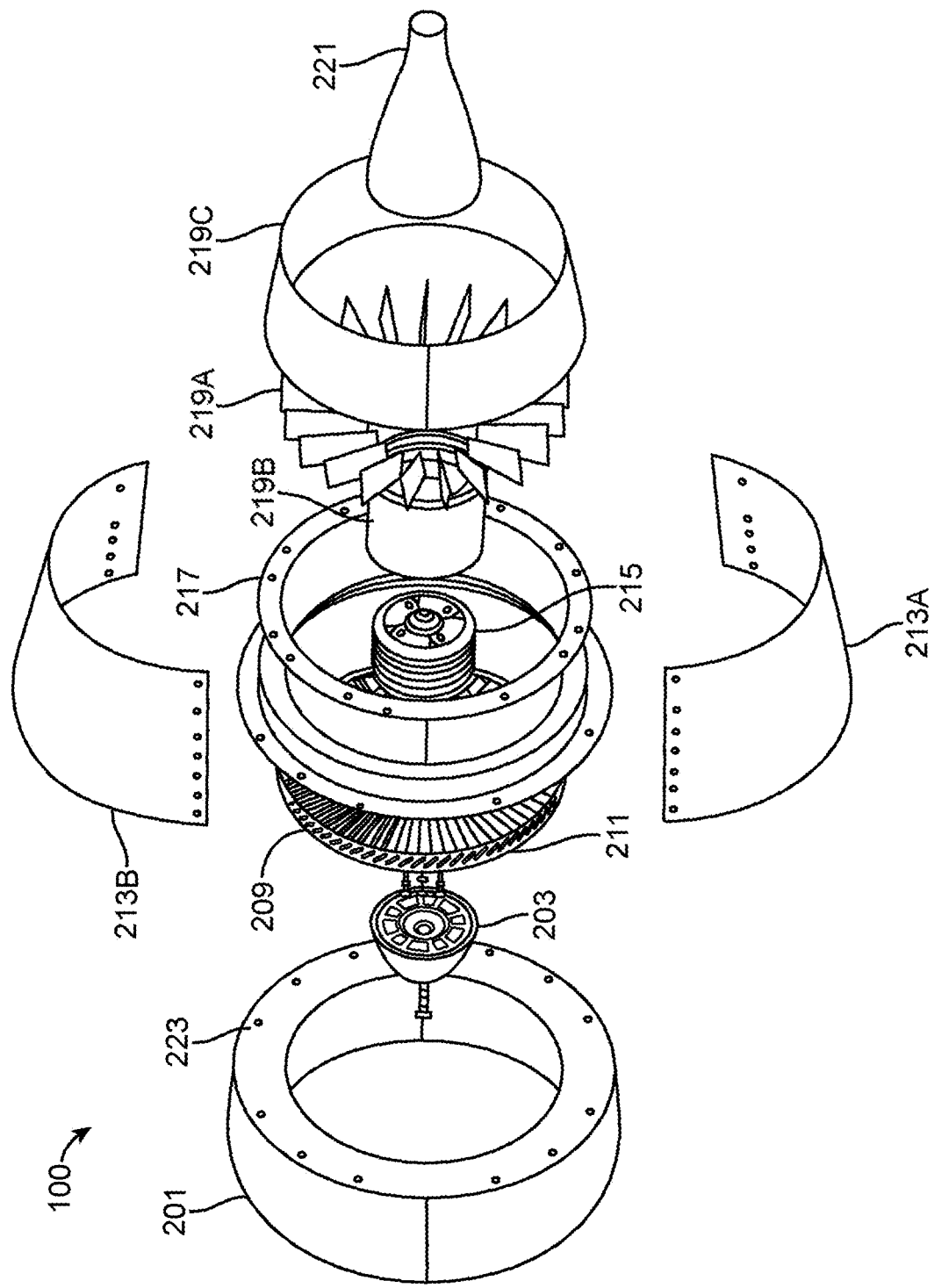
FIG. 2B is a second exploded view of the propulsor fan according to one example as described herein.

FIG. 2A illustrates a first exploded view of the propulsor fan 100 and FIG. 2B illustrates a second exploded view of the propulsor fan 100 according to one example. The propulsor fan 100 may include a plurality of different components as shown in FIGS. 2A and 2B. In one example, the propulsor fan 100 may include a duct lip or scarf inlet 201, a nose cone 203, a hub 205, a blade fan 209, a locking ring 210 (shown in FIGS. 8A to 8C), a tension ring 211, a motor 215, a body housing 217, a plurality of outer casings/sections 213A and 213B, a stator 219, and a tail cone 221. Stator 219 may comprise a plurality of stator blades 219A, motor housing 219B, and stator housing 219C. Other examples of the propulsor fan 100 may include other components than shown in FIGS. 2A and 2B. In one example, the duct lip 201, the outer casings 213A and 213B, and a portion of the stator 219 (e.g., 219C) collectively form a circulation duct that houses the components of the propulsor fan, as shown in FIG. 1.

FIGS. 3A, 3B, 3C, and 3D respectively illustrate a perspective view, a front view, a side view, and a cross-section view of a duct lip 201 of the propulsor fan 100 according to one example. In one example, the duct lip 201 is configured to provide a clean inflow of air to the propulsor fan 100. The duct lip 201 is configured to connect to the body housing 217 in one example. The duct lip 201 may include a plurality of mounting holes 223 on a rear surface of the duct lip 201 as shown in FIG. 2B. Fasteners (e.g., nuts and bolts, rivets, etc.) are placed in the mounting holes 223 to connect the duct lip 201 to a first end 1001 of the body housing 217 as will be further described below.

Figure 3B:
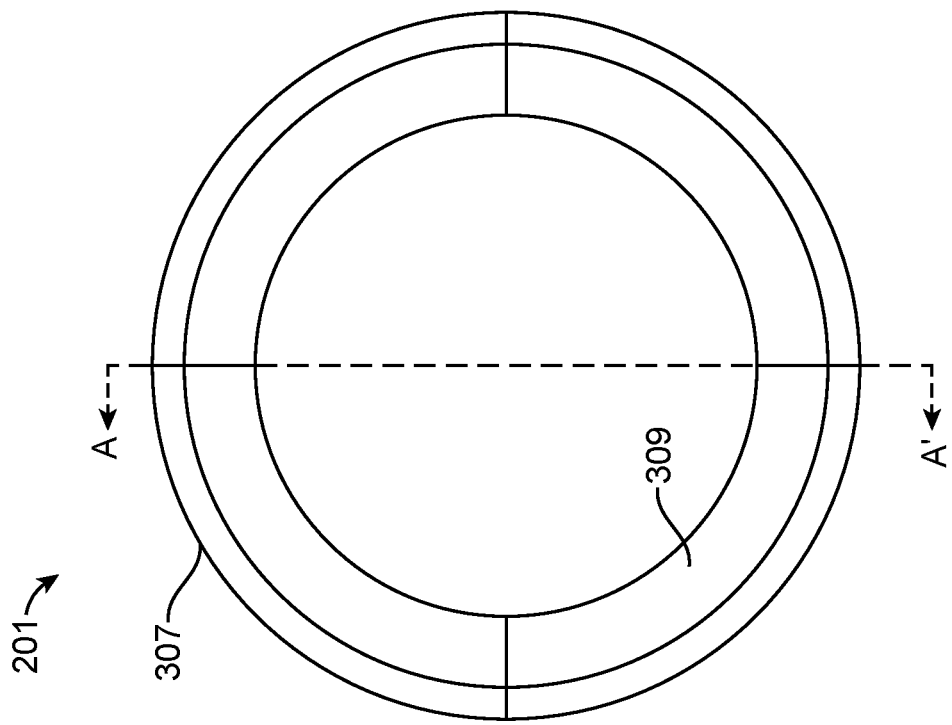
FIGS. 3A, 3B, 3C, and 3D respectively illustrate a perspective view, a front view, a side view, and a cross-section view of a duct lip or scarf inlet of the propulsor fan according to one example as described herein.
Figure 3A:
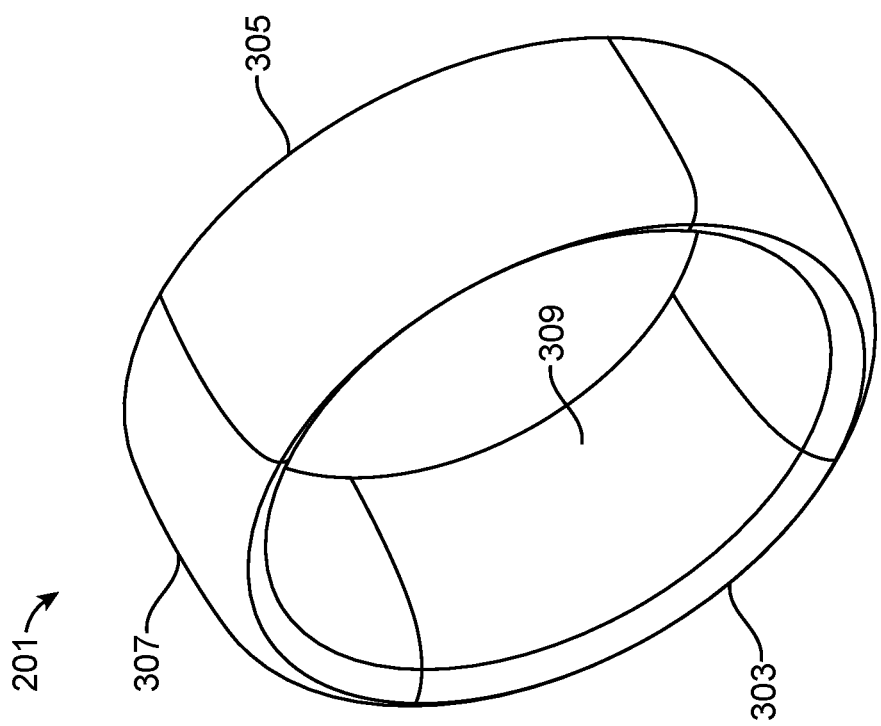

As shown in FIGS. 3A and 3B, duct lip or scarf inlet 201 may comprise a plurality of panels that collectively form the duct lip 201. For example, the duct lip 201 may include a first plurality of panels that collectively form an inner surface 309 of the duct lip 201 and include a second plurality of panels that collectively form an outer surface 307 of the duct lip 201 such that the duct lip 201 has a hollow center through which air is channeled to the blade fan 209. The first and second plurality of panels may be connected to each other via various fastening means such as fasteners (e.g., screws, nuts, bolts) or via welding. The first and second plurality of panels may be made of metal such as aluminum or titanium or composite such as carbon fiber. Alternatively, the duct lip 201 may be made of a single piece of material and may be 3D printed for example.

Figures 3C, 3D:
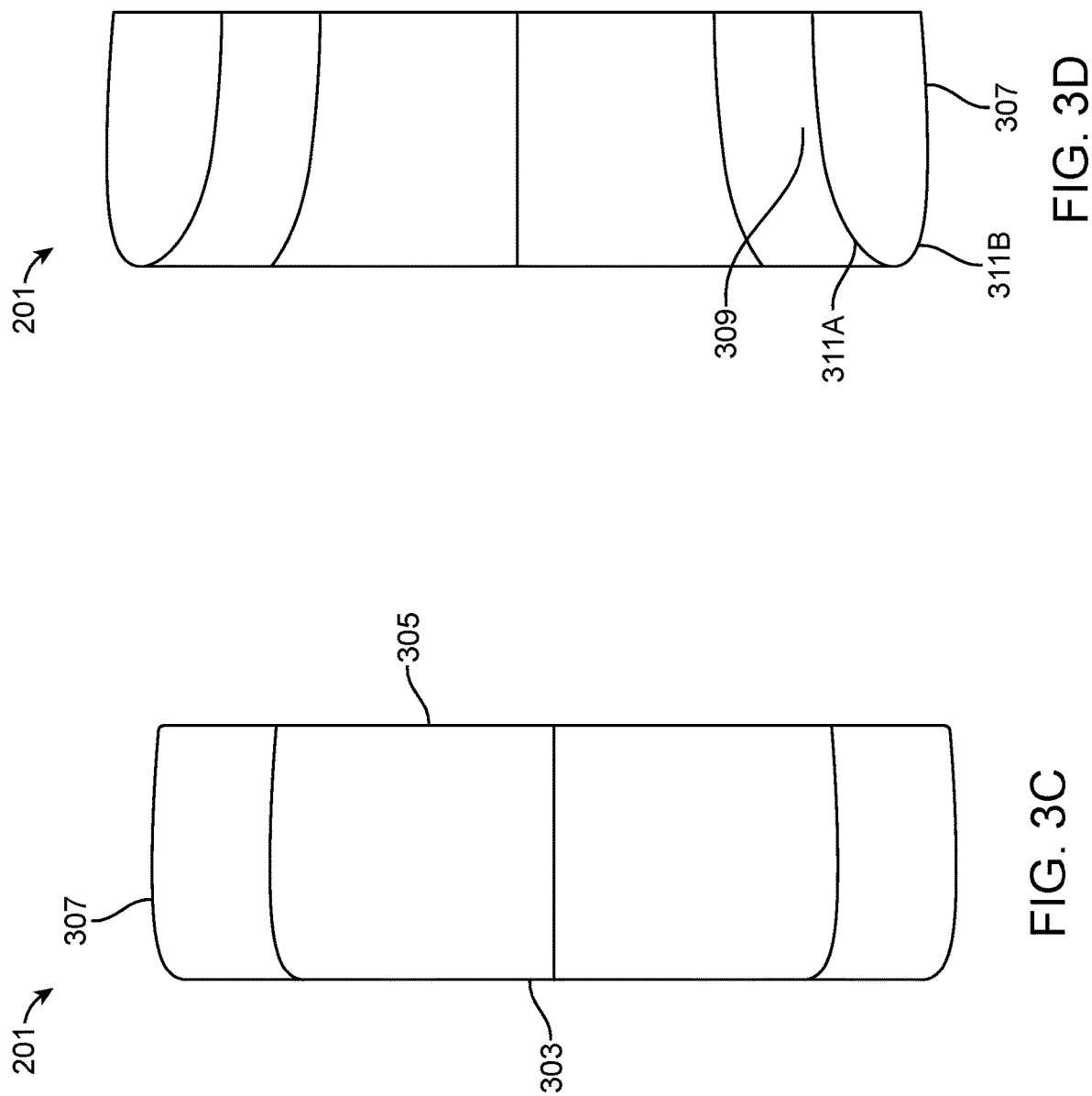

In one example, the duct lip 201 may include a first end 303 (e.g., an inlet) and a second end 305 (e.g., an outlet). The first end 303 receives air and the air exits the second end 305. As shown in FIG. 3C, a diameter of the first end 303 is less than a diameter of the second end 305, but may be the same in other examples. The diameters of the first end 303 and second end 305 of duct lip 201 are dependent on the application of the propulsor fan 100. In other examples, a diameter of the first end 303 may be greater than a diameter of the second end 305.

FIG. 3D is a cross-section view of the duct lip 201 along plane A-A' shown in FIG. 3B according to one example. As previously discussed, the duct lip 201 may include an outer surface 307 and an inner surface 309. The outer surface 307 and the inner surface 309 may both extend from the first end 303 of the duct lip 201 towards the second end 305 of the duct lip 201. Air flows through the inner surface 309 of the duct lip 201. A curvature 311A of the inner surface 309 of the duct lip 201 and a curvature 311B of the outer surface 307 of the duct lip 301 may be designed to balance various factors such as different conditions (e.g., flying conditions such as cruise, takeoff, and landing) and Reynolds number. Those skilled in the art will be able to tailor the duct lip radius for favorable pressure gradients across speed regimes and flight modes of interest.

FIGS. 4A, 4B, 4C, and 4D respectively illustrate a perspective view, a front view, a cross-section view, and a perspective view of the cross-section of a nose cone 203 of the propulsor fan 100 according to one example. Nose cone 203 may be configured to modulate oncoming airflow behavior and reduce aerodynamic drag. The nose cone 203 may also be configured with an impeller to air in cooling air mass flow without contributing significantly to broadband or tonal noise.

In one example, the nose cone 203 may be configured to connect to the motor 215 with the hub 205 disposed between the nose cone 203 and the motor 215. The nose cone 203 may include a plurality of mounting holes on a rear surface of the nose cone 203 as shown in FIG. 2B. Fasteners 207 (e.g., nuts and bolts, rivets, etc.) are placed in the mounting holes to connect the nose cone 203 to a first end of the hub 205. As will be further described below, the fasteners 207 extend through the hub 205 and connect to a first end of the motor 215.

In one example, the nose cone 203 may be conical in shape. However, the nose cone 203 can have different shapes in other examples. As shown in FIGS. 4A to 4D, the nose cone 203 may include an opening 403 (e.g., a hole or orifice) at a first end of the nose cone 203. As the blade fan 209 spins, air is pulled through the opening 403 in the nose cone 203 to cool the motor 215. The secondary mass flow required to cool inner components may determine the size of the inner diameter of the nose cone 203 opening 403. Those skilled in the art will be able to derive this diameter subject to thermal requirements of different electric motors and the air required to cool them at the most constraining condition, typically max continuous operation.

Figure 4D:
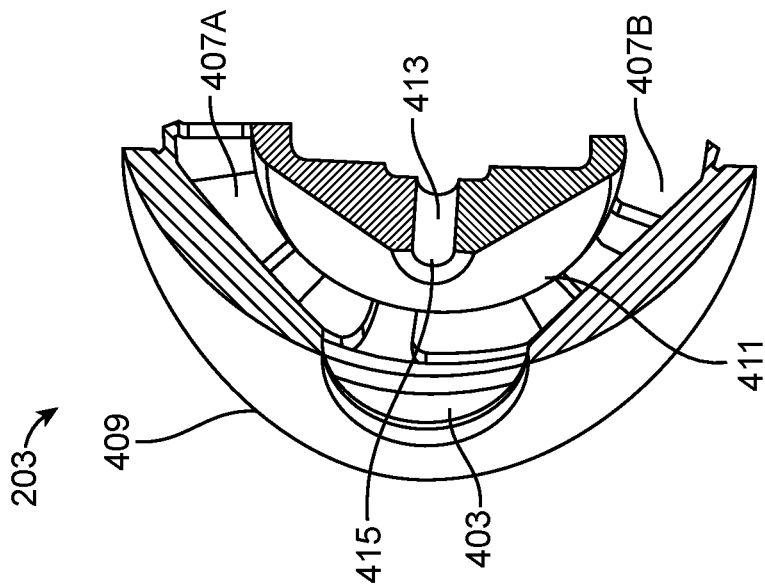
Figure 4C:
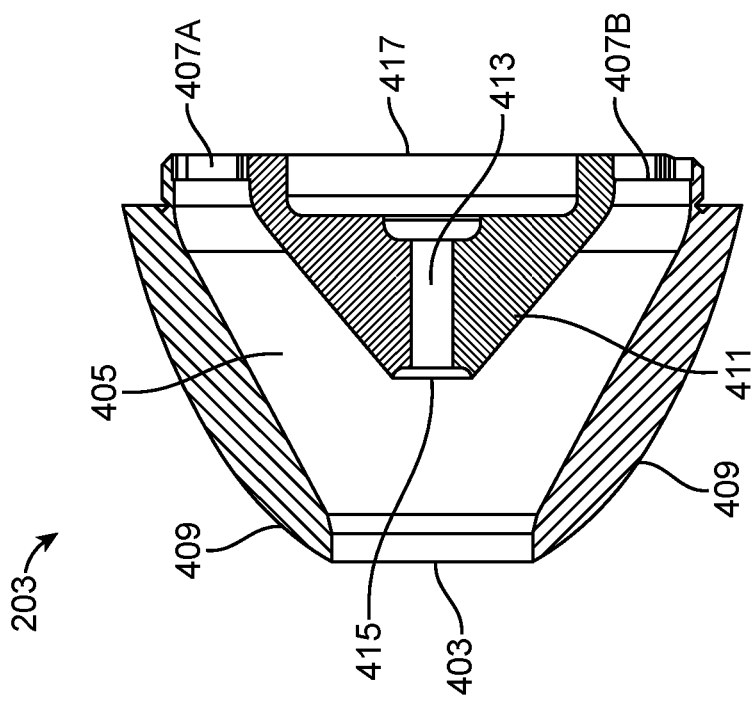

FIG. 4C is a cross-section view of the nose cone 203 along plane B-B' shown in FIG. 4B according to one example. In one example, the nose cone 203 is not solid and may include a cavity. For example, the nose cone 203 may comprise an air channel 405 in one example. The air channel 405 may extend from the opening 403 in the nose cone 203 to a plurality of openings 407 (e.g., 407A and 407B) that are disposed around the circumference of the second end (i.e., the rear surface) of the nose cone 203. Air flows from the opening 403 through the air channel 405 and exits the plurality of openings 407 to cool the motor 215. In one example, the air channel 405 may be formed between an outer surface 409 of the nose cone 203 and a protrusion 411 formed within the nose cone 203 as shown in FIG. 4C and FIG. 4D.

In one example, the protrusion 411 may extend from the second end of the nose cone 203 inward towards the opening 403 of the nose cone 203. The protrusion 411 may have a similar shape as the nose cone 203. For example, the protrusion 411 may also conically shaped. However, in other examples, the protrusion 411 may have a different shape than the nose cone 203.

Generally, the protrusion 411 has a size and shape that may be sized and tuned for a mass air flow required to cool the motor 215. In one example, the protrusion 411 may include an air channel 413 formed through the protrusion 411 through which air flows from an opening 415 of the air channel 413 to an opening 417 on the second end of the nose cone 203. In one example, a center of the air channel 413 may be aligned with a center of the opening 403 in the nose cone 203.

Figure 5B:
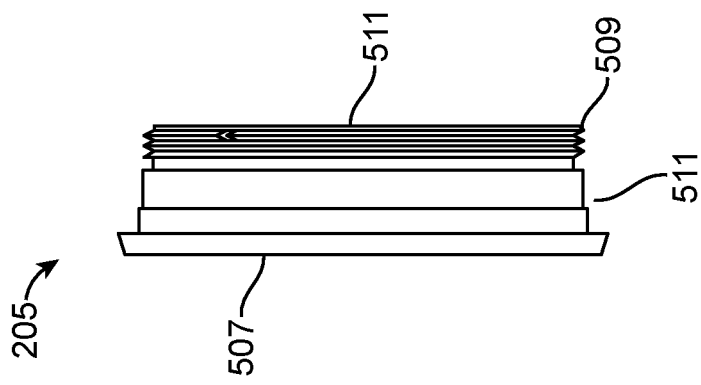
FIGS. 5A and 5B respectively illustrate a front view and a side view of a hub of the propulsor fan according to one example as described herein.
Figure 5A:
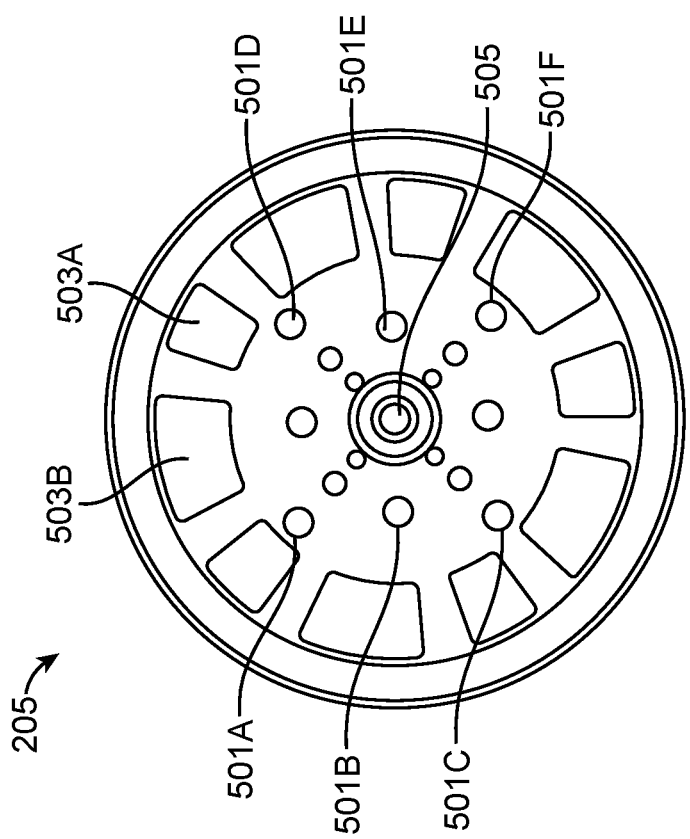

FIGS. 5A and 5B respectively illustrate a front view and a side view of a hub 205 of the propulsor fan 100 according to one example. The hub 205 is the central portion of the propulsor fan 100 and is disposed at a center of the blade fan 209 as will be further described below. The hub 205 may be configured to connect to the nose cone 203, the locking ring 210, and the motor 215 in one example.

As shown in FIGS. 5A and 5B, the hub 205 may be cylindrical in shape in one example. The diameter of a first end 507 of the hub 205 may match a diameter of the second end of the nose cone 203 in one example. The first end 507 (i.e., a front surface) of the hub 205 may include a plurality of mounting holes 501A to 501F that are formed through a thickness of the hub 205. The position of the mounting holes 501 may be such that the mounting holes 501 are aligned with the mounting holes of the nose cone 203 when the second end of the nose cone 203 is mated to the first end 507 of the nose hub 205. The fasteners 207 (as shown in FIG. 2A) may be configured to pass through the mounting holes 501A to 501F and connect to a first end (i.e., a front surface) of the motor 215. For example, the fasteners 207 screw into threaded holes 225 on the first end of the motor 215.

In one example, the hub 205 also may include a plurality of openings 503 that extend through the thickness of the hub 205 such as openings 503A and 503B. The plurality of openings 503 have a shape and size that match (i.e., are the same) as the openings 407 in the rear surface of the nose cone 203. The openings 503 are configured to align with the openings 407 in the rear surface of the nose cone 203 when the nose cone 203 and the hub 205 are mated to each other. Thus, air exiting the openings 407 of the nose cone 203 flow through the openings 503 included in the hub 205. In one example, the plurality of openings 503 included in the hub have different sizes. For example, opening 503A may be smaller than opening 503B.

In one example, the hub 205 may also include an opening 505 that extends through a thickness of the hub 205. The opening 505 may be positioned at a center of the hub 205. In one example, a center of the opening 205 may be configured to be aligned with a center of the air channel 413 of the nose cone 203. Thus, air flow exiting the air channel 413 of the nose cone 203 flows through the opening 505 in the hub 205 to cool the motor 215.

In one example, a second end 511 of the hub 205 that is opposite the first end 507 may include a connection mechanism 509 around the outer circumference of the second end 511 of the hub 205. The connection mechanism 509 may be configured to connect the hub 205 to the locking ring 210. In one example, the connection mechanism 509 may be threads such that the hub 205 screws into the locking ring 210. Once the hub 205 is connected to the locking ring 210, the locking ring 210 surrounds the outer circumference of the hub 205. The motor 215 may be configured to mate to the outer face of the second end 511 of the hub 211.

In one example, the hub 205 may include an intermediate area 511 disposed between the first end 507 and second end 511 of the hub 205. In one example, the blade fan 209 may be configured to be disposed around the circumference of the intermediate area 511 while the hub 205 may be placed through a center of the blade fan 209.

Figure 6B:
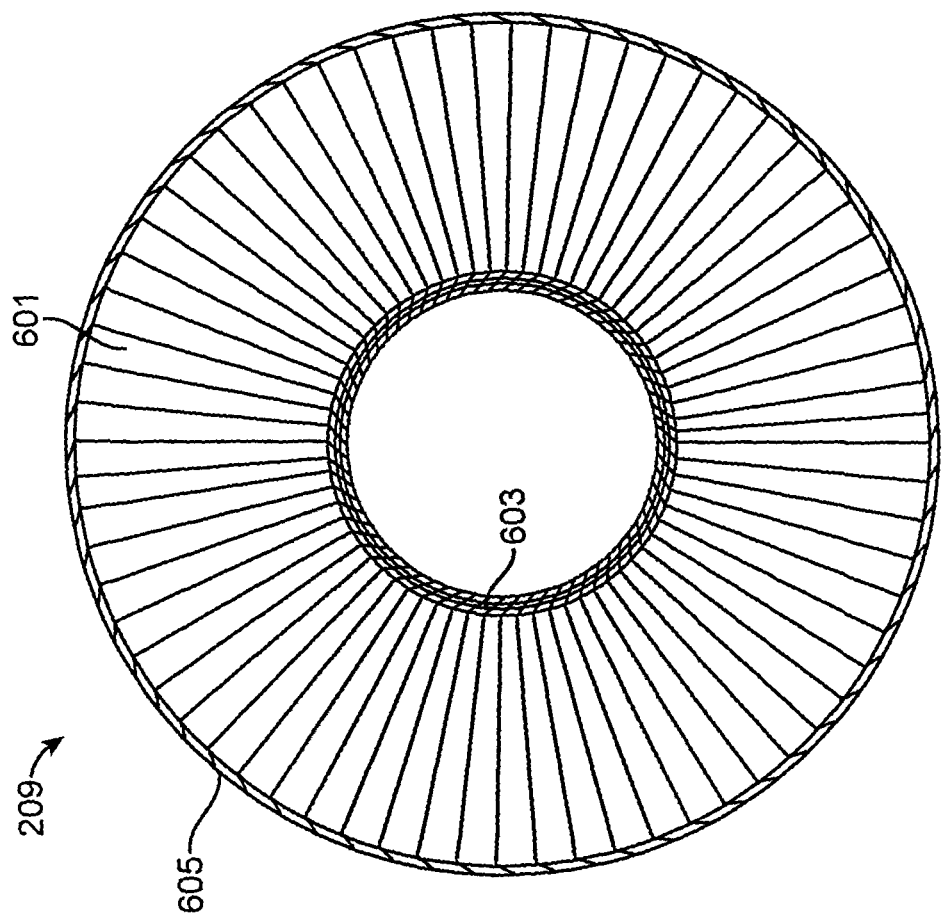
FIGS. 6A and 6B respectively illustrate a perspective view and a front view of a blade fan of the propulsor fan according to one example as described herein.
Figure 6A:
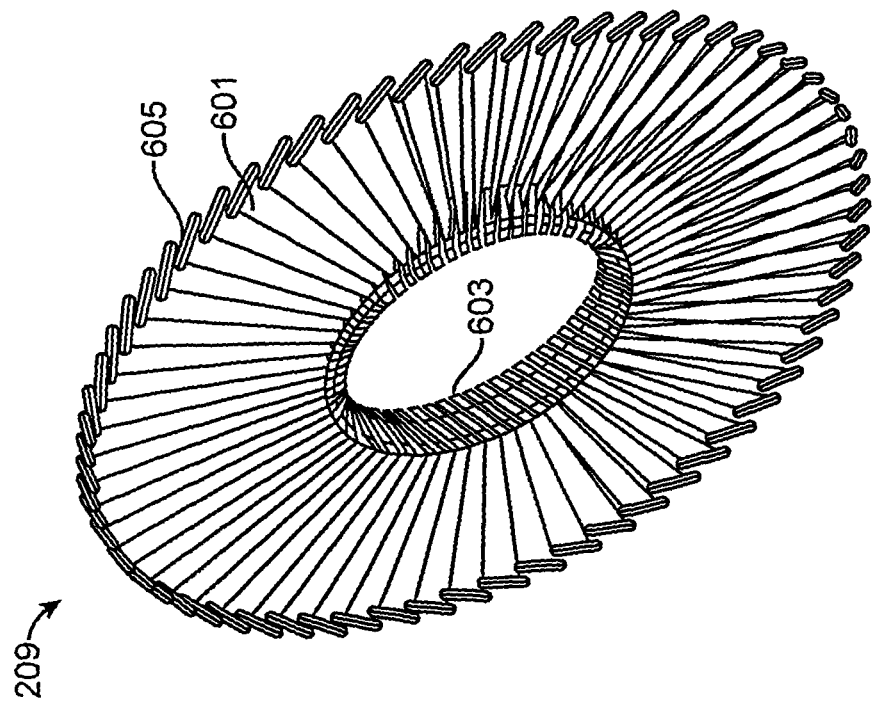

FIGS. 6A and 6B respectively illustrate a perspective view and a front view of a blade fan 209 of the propulsor fan 100 according to one example. As shown in FIGS. 6A to 6B, the blade fan 209 may include a plurality of blades 601. The total number of blades 601 included in the blade fan 209 may be significantly more than the number of blades included in a conventional propulsor fan that has 2 to 5 blades. In one example, the blade fan 209 may include a range of blades 601 from 20 blades to an upper range of 100 to 150 blades having a hub/tip ratio of 0.3 to 0.5. However, any number of blades greater than five may be used. Generally, the total number of blades 601 included in the blade fan 209 may be dependent on the application. In one example, the material for the blades 601 blade fan 209 may be also dependent on the type of application of the propulsor fan. The blades may be made of metal such as aluminum or titanium, or a composite such as carbon fiber, or combinations thereof.

In one example, the blade fan 209 reduces overall blade noise as the blade fan 209 spins at a low tip speed (around 300-450 ft/sec). As described herein, the tensioned fan blade 209 allows many more blades to exist within mechanical material limits and still achieve ultrasonic signatures and low subsonic tip speeds. Furthermore, the higher number of blades 601 raises the tonal noise into ultrasonic frequencies outside the upper limit of human audibility (2:16,000 Hz for typical adults). Furthermore, the low blade loading due to the higher blade count also reduces the severity of vortex-to-vortex collisions which cause broadband noise.

As also shown in FIGS. 6A and 6B, the plurality of blades 601 are arranged to form a circular ring shape with a hollow center where the hub 205 is disposed (see FIG. 2A). Each blade 601 may be positioned such that at least a portion of the leading edge and trailing edge of the blade 601 are overlapped by neighboring blades 601. For example, a leading edge of a given blade may be overlapped by the trailing edge of a blade to the left of the given blade and a trailing edge of the given blade may be overlapped by a leading edge of a blade to the right of the given blade.

FIGS. 7A, 7B, 7C, and 7D respectively illustrate a perspective view, a front view, a side view, and a top view of a blade 601 included in the blade fan 209 shown in FIGS. 6A and 6B according to one example. In one example, each blade 601 comprises a first locking end 605, a second locking end 603, and an airfoil 607 disposed between the first locking end 605 and the second locking end 603. The blade 601 may include other features than those described herein in other examples.

In one example, the first locking end 605 may be located at the tip of the blade 601. The first locking end 605 may be configured to be inserted into the tension ring 211 and lock the blade 601 into the tension ring 211 such that the tip of the blade 601 may be tensioned. By tensioning the tips of the blades 601, the pitch (i.e., angle) of the tips of the blades 601 may be substantially the same during thrust generation or while the propulsor fan 100 is at rest thereby reducing noise pollution.

As shown in FIGS. 7A to 7D, the first locking end 605 may be rectangular in shape with chamfered edges, but other shapes can be used for the first locking end 605. In one example, the first locking end 605 has a width and thickness that may be greater than a width and thickness of the tip of the airfoil 607. However, in other examples the first locking end 605 may be the same width or narrower than the tip of the blade 601. Those skilled in the art will tailor edges, chamfers, surfacing, and bezeling to account for localized stresses and strains due to tensioning.

In one example, the second locking end 603 may be located at the root of the blade 601. The second locking end 606 may be configured to be inserted into the locking ring 210 and lock the blade 601 into the locking ring 210. By tensioning the roots of the blades 601, the pitch (e.g., angle) of the roots of the blades 601 may be substantially the same during thrust generation or while the propulsor fan 100 may be at rest thereby reducing noise pollution. As shown in FIGS. 7A to 7D, the second locking end 603 has a plurality of different surfaces (e.g., straight surfaces and curved surfaces) to increase the surface area that contacts the locking ring 210 to reduce blade deflection. In one example, the second locking end 603 has a width that may be greater than the root of the blade 601 and may be wider than a width of the first locking end 605. However, in other examples the second locking end 603 may be the same width or narrower than the root of the blade 601.

The airfoil 607 is disposed between the first locking end 605 and the second locking end 603. In one example, the airfoil 607 comprises a geometric twist 609 in the airfoil 607. The geometric twist 609 may be a change in airfoil angle of incidence measured with respect to the root of the blade 601. That is, the airfoil 607 may include a plurality of different angles of incidence across the length of the airfoil 607 due to the geometric twist 609. For example, the airfoil 607 may have a first angle of incidence at a first side of the geometric twist 609 (i.e., below the geometric twist 609 shown in FIGS. 7A to 7C) and may have a second angle of incidence at a second side of the geometric twist 609 (i.e., above the geometric twist 609 in FIGS. 7A to 7C).

Figure 7C:
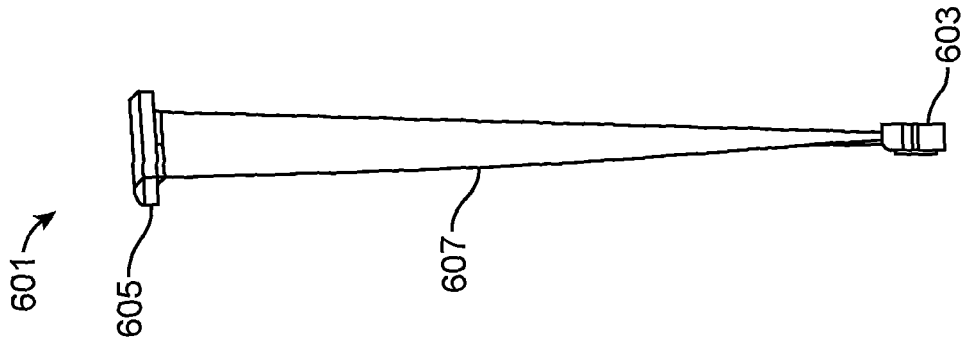
FIGS. 7A, 7B, 7C, and 7D respectively illustrate a perspective view, a front view, a side view, and a top view of a fan blade included in the blade fan or bladed disk shown in FIGS. 6A and 6B according to one example as described herein.
Figure 7B:
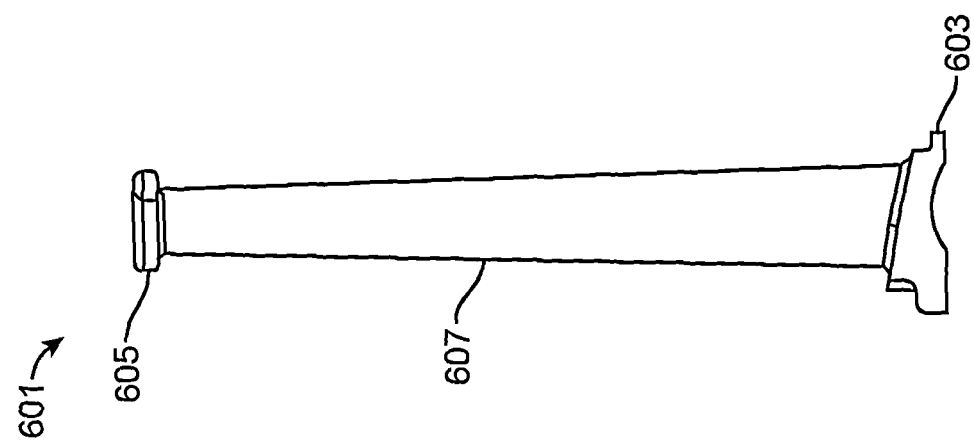
Figure 7A:
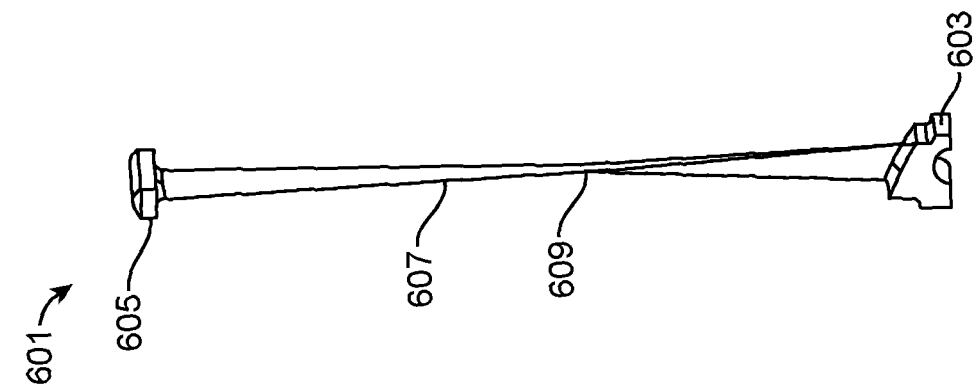
Figure 7D:
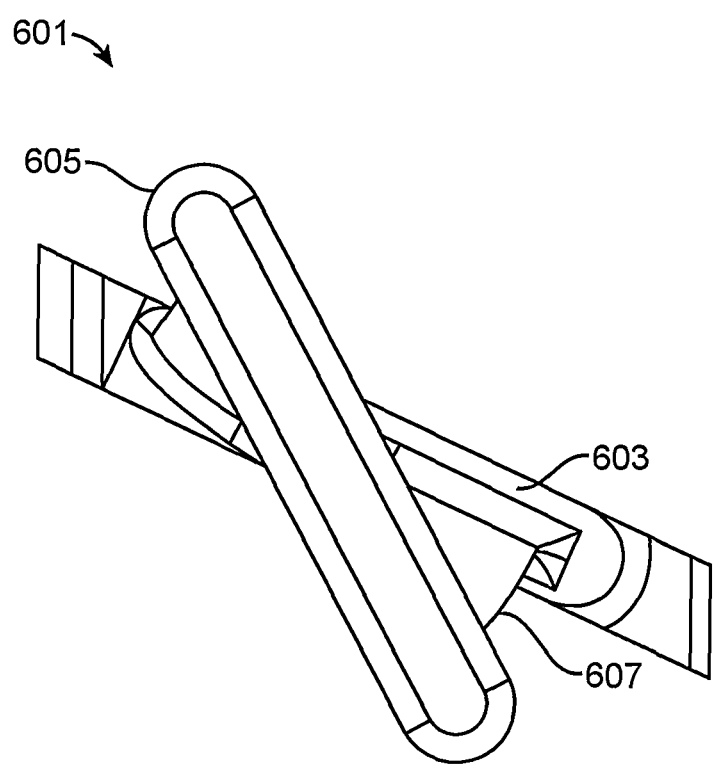

As a result of the geometric twist 609, the first locking end 605 and the second locking end 609 are misaligned from each other when viewed from the top view of the blade 601 as shown in FIG. 7D. In one example, the geometric twist 609 may begin at a portion of the airfoil 607 that may be closer to the root of the blade 601 than the tip of the blade 601. The geometric twist 609 between the root and tip chord may vary as much as 45 degrees.

Referring back to FIGS. 6A, and 6B, in one example the blades 601 are positioned such that the second locking ends 603 are arranged in parallel with respect to each other around a circumference thereby forming the hole at the center of the blade fan 209. As a result, the first locking ends 605 are also arranged in parallel with each other and the airfoil 607 of each blade 601 overlaps another airfoil of an adjacent blade 601 due to the geometric twist 609 in the airfoil 607.

Figure 8C:
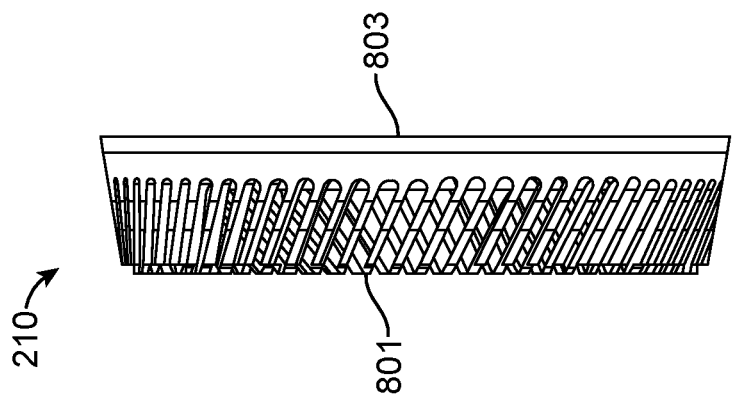
FIGS. 8A, 8B, and 8C respectively illustrate a perspective view, a front view, and a side view of a locking ring of the propulsor fan according to one example as described herein.
Figure 8B:
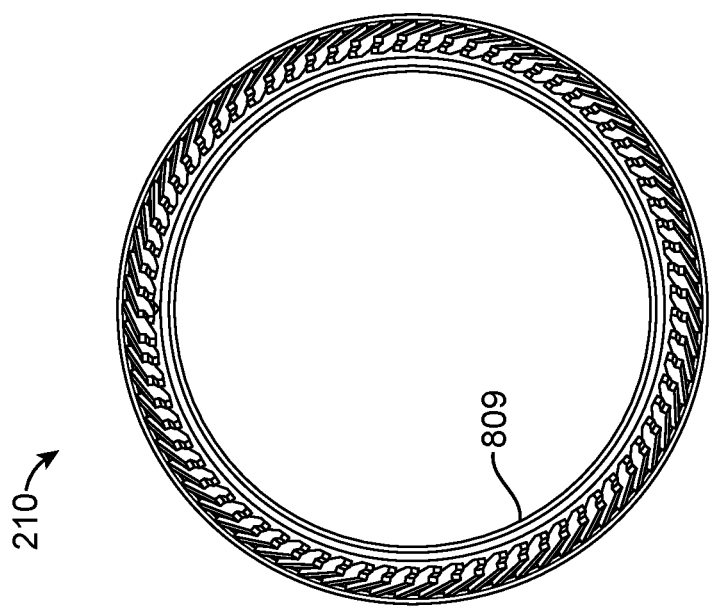
Figure 8A:
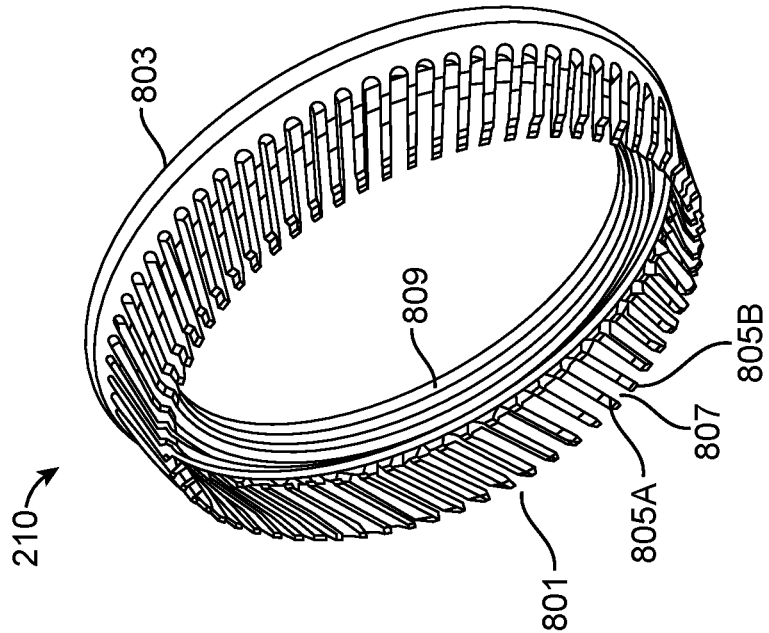

FIGS. 8A, 8B, and 8C respectively illustrate a perspective view, a front view, and a side view of a locking ring 210 of the propulsor fan 100 according to one example.

Generally, the locking ring 210 may be configured to connect to the blade fan 209 and the hub 205 and beneficially tensions the roots of the blades 601. Thus, the blades 601 of the blade fan 209 may be tensioned at both the tips and the roots to maintain the angle of the blades 601 during operation. The locking ring 210 may be made of metal such as aluminum or titanium or a composite such as carbon fiber, or combinations thereof.

The locking ring 210 may include a first end 801 and a second end 803. In one example, the first end 801 has a diameter that may be less than a diameter of the second end 803 thereby forming a conical shape. The tailoring of this shape may be dictated by the needs of the primary internal flow to the fan (i.e., not the cooling flow) and may also take into account any boundary layer pressure gradients along the center body in the presence of the fan. In one example, the first end 801 of the locking ring 210 may be configured to directly connect the blade fan 209 to the locking ring 210 thereby locking the blade fan 209 to the locking ring 210. The first end 801 of the locking ring 210 may include a plurality of locking teeth 805 (e.g., 805A, 805B, etc.). In one example, the locking teeth 805 are protrusions that extend from a body of the locking ring 210 at an angle with respect to a reference that may be perpendicular to the second end 803 of the locking ring.

As shown in FIG. 8A, a plurality of slots 807 are formed by the locking teeth 805. For example, a slot 807 may be formed between a pair of locking teeth including locking tooth 805A and locking tooth 805B. The slots 807 have a width and depth that match dimensions of the second locking ends 603 of the blade fan 209. The slots 807 extend partially through the thickness of the locking ring 210 such as ¾ of the thickness of the locking ring 210, for example.

In one example, each of the plurality of slots 807 may be configured to connect to a corresponding one of the plurality of blades 601 of the blade fan 209. In particular, the second locking end 603 of each blade 601 may be inserted into one of the slots 807 thereby securing the blade 601 to the locking ring 210 through the direct contact of the surfaces of the second locking end 603 and the locking teeth 805 that form the slots. In one example, a fastener such as an epoxy may also applied to the second locking end 603 of each blade 601 to further strengthen the connection between the blades 601 and the locking ring 210. By locking the second locking end 603 of the blades 601 to the locking ring 210, the pitch of the roots of the blades 601 may be maintained to be substantially the same during thrust generation or at rest thereby reducing audible noise that may be emitted from the propulsor fan 100 since changes in pitch can be perceivable to the human ear.

In one example, the second end 803 of the locking ring 210 may include a connection mechanism 809 at an inner circumference of the second end 803 of the locking ring 210. The connection mechanism 809 may be configured to connect the locking ring 210 to the connection mechanism 509 of the hub 205 (see FIG. 5B), for example. In one example, the connection mechanism 809 may be threads that match the threads of the connection mechanism 509 of the hub 205 thereby allowing the hub 205 to be screwed into the locking ring 210. Since the motor 215 may be connected to the hub 205, the hub 205 spins thereby causing the locking ring 210 and the blade fan 209 to also spin.

FIGS. 9A and 9B respectively illustrate a perspective view and a side view of a tension ring 211 of the propulsor fan 100 according to one example. The tension ring 211 may be configured to connect to the blade fan 209 by being placed around the circumference of the blade fan 209. More specifically, the tension ring 211 may be configured to connect to all of the first locking ends 605 of the blade fan 209 according to one example. By locking the first locking ends 605 of the blades 601 to the tension ring 211, the pitch of the tips of the blades 601 may be maintained to be substantially the same during thrust generation and at rest thereby reducing audible noise that is emitted from the propulsor fan 100 since changes in pitch can be perceivable to the human ear. Thus, pre-tensioning the blades 601 using the tension ring 211 reduces inefficiencies due to tip gaps. In one example, the tension ring 211 may be made of metal such as aluminum or titanium or a composite such as carbon fiber, or combinations thereof. However, other materials may be used in other examples.

As shown in FIGS. 9A and 9B, the tension ring 211 may include a first end 903 and a second end 905. In one example, the first end 903 has a diameter that may be substantially the same as a diameter of the second end 905. The body 909 of the tension ring 211 may be disposed between the first end 903 and the second end 905.

In one example, the body 909 of the tension ring 211 may include a plurality of openings (i.e., slots) 907 that extend through the entire thickness of the tension ring 211. Each opening 907 may be configured to connect to a first locking end 605 of one of the plurality of blades 601. Thus, there may be a one-to-one relationship between each opening 907 of the tension ring 211 and the blades 601. In one example, a fastener such as an epoxy is also applied to the first locking end 605 of each blade 601 to further strengthen the connection between the blades 601 and the tension ring 211.

In one example, the plurality of openings 907 are formed at an angle with respect to a reference that may be perpendicular to the first end 903 or second end 905. The angle in which the openings 907 may be formed matches the pitch of the first locking ends 605 of the blades 601. The dimensions of the openings 907 substantially match the dimensions of the first locking ends 605 such that the first locking ends 605 are locked to the tension ring 211 once the first locking ends 605 are inserted into the openings 907 of the tension ring 211 and the first locking ends 605 are in direct contact with the tension ring 211.

Figure 10A:
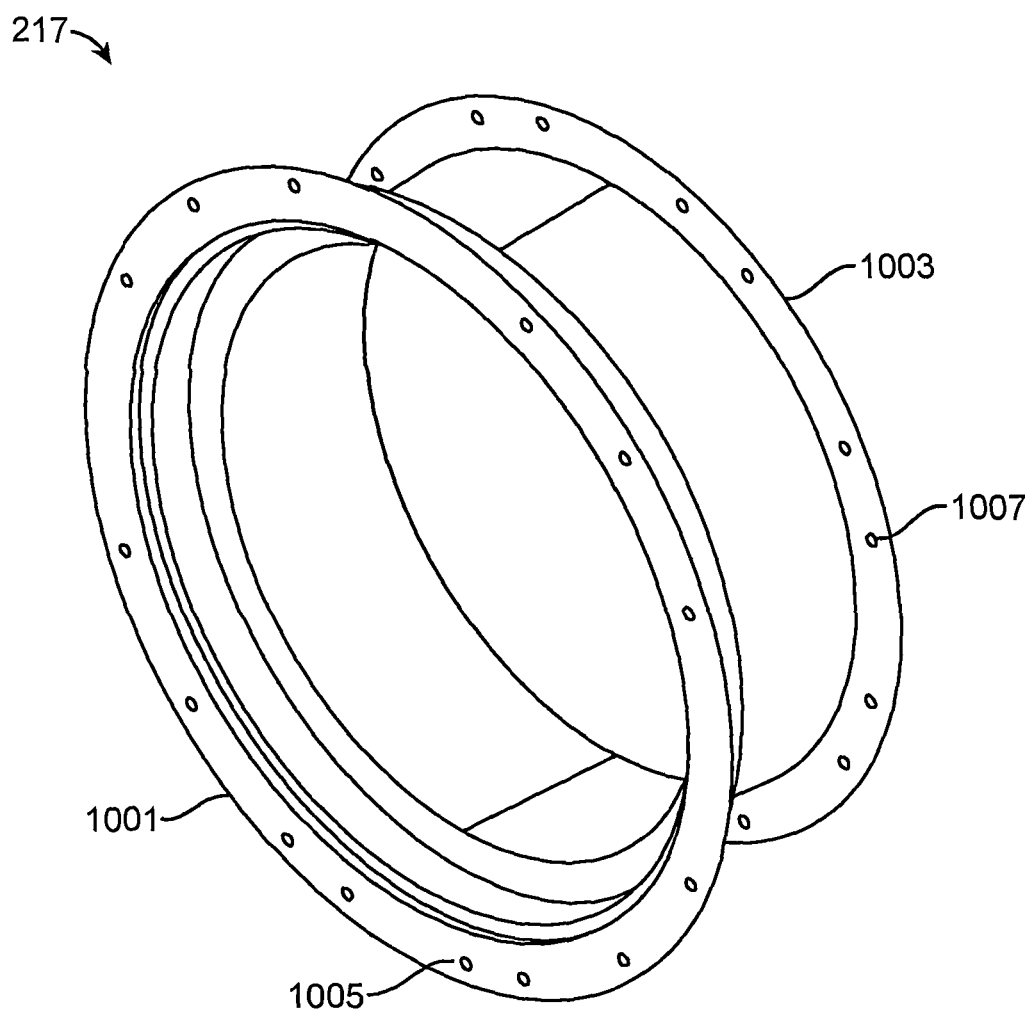

FIGS. 10A, 10B, and 10C respectively illustrate a perspective view, a front view, and a side view of an inner duct body housing 217 (hereinafter referred to a "body housing") of the propulsor fan 100 according to one example. In one example, the body housing 217 may be configured to house (i.e., partially surround) components of the propulsor fan 100. For example, the blade fan 209, hub 205, tension ring 211, locking ring 210, and motor 215 may be housed within the body housing 217 in one example. Other components of the propulsor fan 100 may be contained within the body housing 217 in other examples. In one example, the body housing 217 may be made of metal such as aluminum or titanium or a composite such as carbon fiber, or combinations thereof. However, other materials may be used in different examples.

In one example, the body housing 217 may be cylindrical in shape and may include a first end 1001 (e.g., an inlet) and a second end 1003 (e.g., an outlet). The first end 1001 has a diameter that may be greater than a diameter of the second end 1003 in one example. The first end 1001 may include a plurality of mounting holes 1005 that are formed around the circumference of the first end 1001 of the body housing 217. In one example, the first end 1001 of the body housing 217 may be configured to connect to the second end 305 of the duct lip 201 such that the mounting holes 223 in the duct lip 201 are aligned with the mounting holes 1005 of the body housing 217. As previously mentioned above, fasteners 207 may be used to secure the duct lip 201 to the first end 1001 of the duct body housing 217.

In one example, the second end 1003 of the body housing 217 may include a plurality of mounting holes 1007 that are formed around the circumference of the second end 1003 of the body housing 217. In one example, the second end 1003 of the body housing 217 may be configured to connect to a first end (e.g., an inlet) of the stator 219. While the second end 1003 of the body housing 217 may be connected to the first end of the stator 219, the mounting holes 1007 in the second end 1003 of the body housing 217 may be aligned with mounting holes on the first end of the stator 219. Fasteners (e.g., nuts, bolts, rivets) may be used to secure the second end 1003 of the body housing 217 to the first end of the stator 219.

In one example, the body housing 217 may include a plurality of intermediate portions 1009 that are each configured to house different components of the propulsor fan. The plurality of intermediate portions 1009 include a first intermediate portion 1009A that extends from the first end 1001 and a second intermediate portion 1009B that extends from the second end 1003. The intermediate portions 1009 of the body housing 217 are disposed between the first and second ends 1001, 1003 of the body housing 217.

As shown in FIG. 10C, the first intermediate portion 1009A has a diameter that may be different than a diameter of the second intermediate portion 1009B. For example, the diameter of the first intermediate portion 1000A may be greater than the diameter of the second intermediate portion 1000B. Furthermore, the first intermediate portion 1009A has a diameter that may be less than the first end 1001 and the second intermediate portion 1009B has a diameter that may be less than the second end 1003.

In one example, the first intermediate portion 1009A may be configured to house the hub 205, the blade fan 209, the locking ring 210, and the tension ring 211. Since the tension ring 211 has the largest diameter of the components housed in the first intermediate portion 1009A, the diameter 1009A of the first intermediate portion 1009A may be based on the diameter of the tension ring 211. In one example, the diameter of the first intermediate portion 1009A may be substantially the same as the diameter of the tension ring 211 thereby allowing the tension ring 211 to be securely fastened within the first intermediate portion 1000A due to a press fit, for example.

In one example, the second intermediate portion 1009B may be configured to house the motor 215 and a portion of the stator 219. The length of the second intermediate portion 1009B may be based on a length of the motor 215 and a length of the portion of the stator 219 that are housed in the intermediate portion. The second intermediate portion 1000B has a length that may be at least as long as the motor 215 and the portion of the stator 219 in order to contain the motor 215 and the portion of the stator 219 in the second intermediate portion 1009B. In one example, the diameter of the second intermediate portion 1009B may be based on the mass air flow of air entering and exiting the stator 219. Those skilled in the art will be able to tailor the diameter in order to induce favorable pressure gradients across a plurality of design speeds of interest to minimize flow separation or swirl. The inner cavity of the second portion 1009B may also be tuned to reduce noise.

FIGS. 11A, 11B, 11C, and 11D respectively illustrate a perspective view, a front view, a side view, and a cross section view of a stator 219 of the propulsor fan 100 according to one example. In one example, the stator 219 comprises a plurality of stator blades 219A, a motor housing 219B, and a stator housing 219C. The stator 219 may include other components than those shown in FIGS. 11A to 11D in other examples.

Figure 11A:
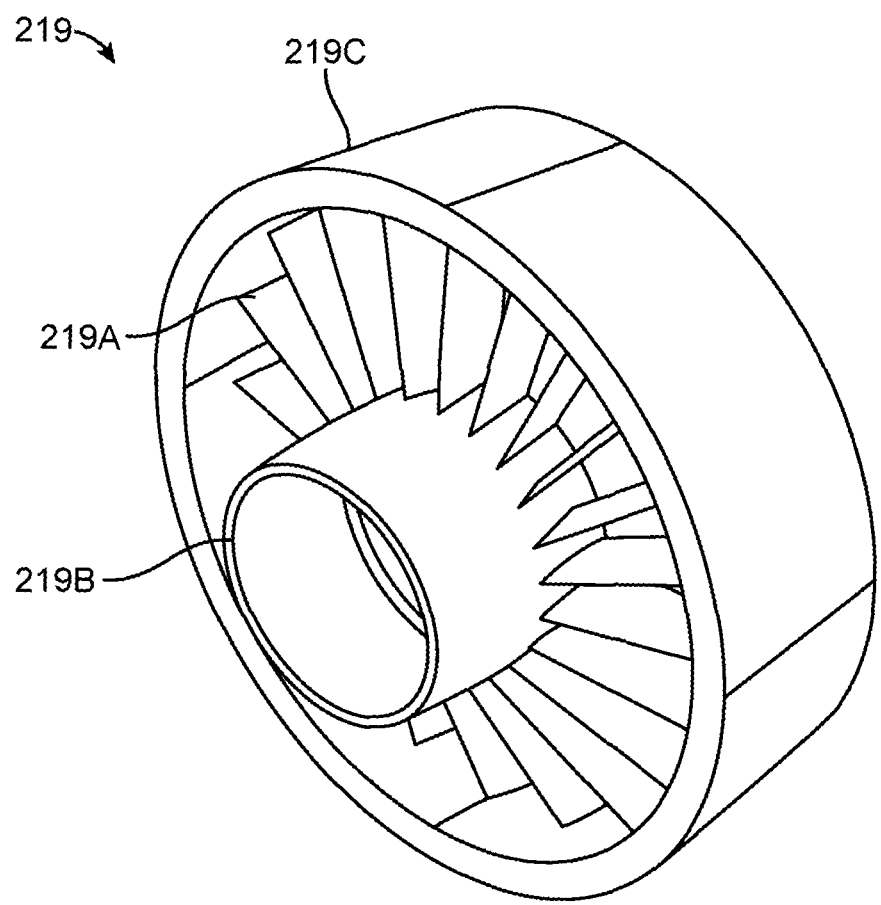
FIGS. 11A, 11B, 11C, and 11D respectively illustrate a perspective view, a front view, a side view, and a cross section view of a stator of the propulsor fan according to one example as described herein.
Figures 11B, 11C:
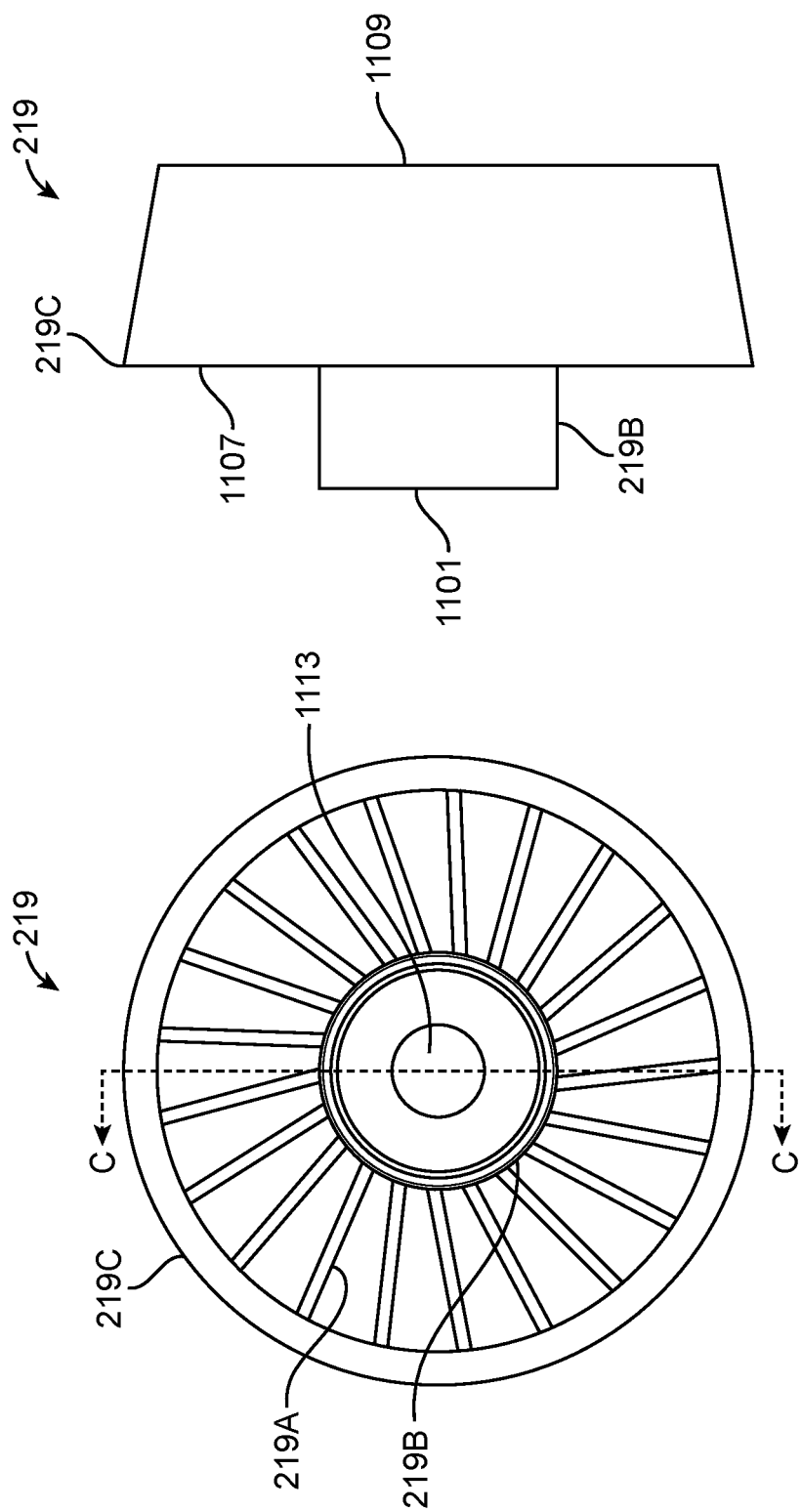
Figure 11D:
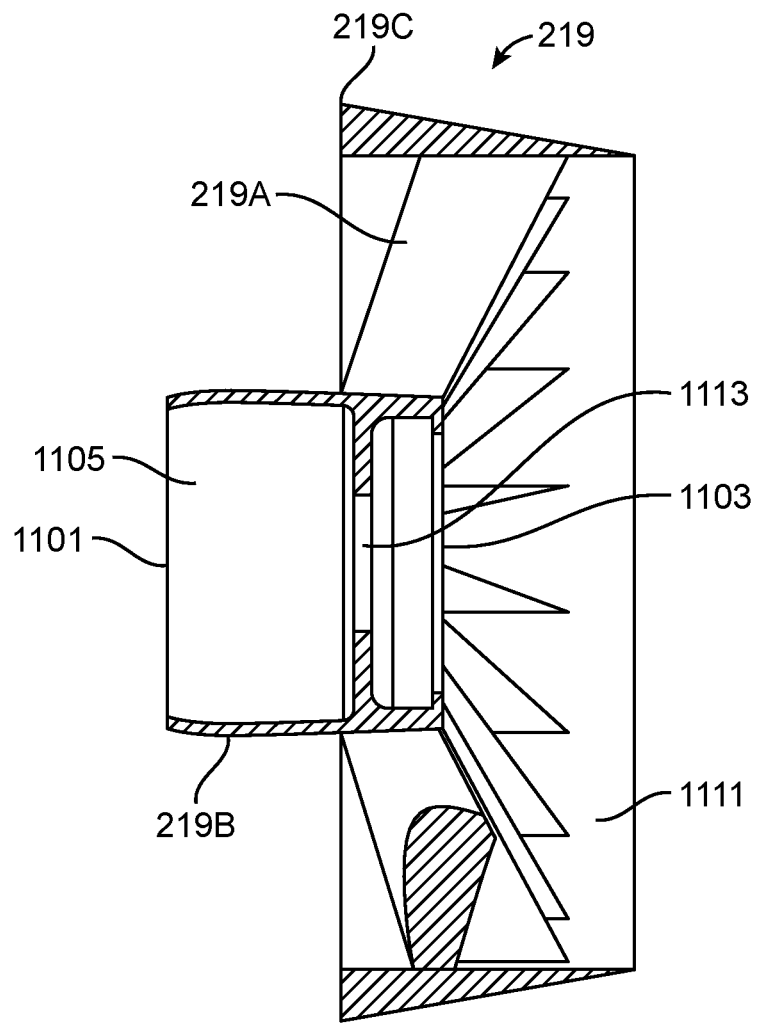

FIG. 11D illustrates a cross-section view of the stator 219 along plane C-C' in FIG. 11B. In one example, the motor housing 219B may be cylindrical in shape and may include a first end 1101 and a second end 1103 as shown in FIG. 11D. As shown in FIG. 11D, the motor housing 219B may include a cavity 1105 disposed between the first end 1101 and the second end 1103. The cavity 1105 may extend from the first end 1101 towards the second end 1103, but does not extend to the second end 1103. In one example, the cavity 1105 may be configured to house the motor 215. That is, the motor 215 may be placed within the cavity 1105 of the motor housing 219B. Thus, the shape and size of the cavity 1105 may be dependent on the shape and size of the motor 215. Since the motor 215 may be placed within the cavity 1105 and the motor 215 may be indirectly connected to the hub 205, the stator 219 also functions as a structural component to support the hub 205 and other components of the propulsor 100.

In one example, the motor housing 219B may include an orifice or gap 1113 through a center of the motor housing 219B as shown in FIGS. 11B and 11D. The diameter of the gap 1113 may be less than a diameter of the motor 215 to prevent the motor 215 from falling through the gap 1113. The gap 1113 may be placed in the motor housing 219B to aid in heat dissipation thus cooling the motor 215.

Referring to FIG. 11B, the stator 219 may include a plurality of stator blades 219A. The stator blades 219A extend radially from the motor housing 219B. That is, the root of each blade 219A may be connected to the motor housing 219B and the airfoil of the stator blade 219 extends outward away from the motor housing 219B. In one example, each blade 219A extends away from the motor housing 219B at an angle measured with respect to a reference line that extends perpendicular from a point on the motor housing 219B from which the stator blade 219A extends.

In one example, the stator blades 219A conduct heat away from the motor 215. Since the blades 219A contact the motor housing 219B which houses the motor 215, air that passes over the blades 219A dissipates heat generated by the motor 215. In one example, the arrangement of the blades 219A also reduces noise generated by the blade fan 209 and controls thrust generated by the propulsor fan 100. The blade count of the stator blades 219A may be selected so that the harmonics of the stator cancel out harmonics of the blade fan 209. For ultrasonic fans, because of the localized low Reynolds number along the blade, those skilled in the art will see that the blade fan 209 may carry a plurality of blades 601 that may be higher in count (i.e., total amount) than the stator blades 219A for favorable acoustics. This may vary anywhere from 50% to 200% more blades for a particular set of design tones.

In one example, the stator housing 219C may be configured to house the stator blades 219A and the motor housing 219B. That is, the stator blades 219A are placed within the stator housing 219C such that the stator housing 219C surrounds the circumference of the blades 219A. In one example, the stator housing 219C may include a first end 1107 (i.e., an inlet) and a second end 1109 (i.e., an outlet). As shown in FIG. 11C, the first end 1107 has a diameter that may be greater than a diameter of the second end 1109. Thus, the stator housing 219C may have a conical shape. However, the stator housing 219C may have other shapes in other examples.

Referring to FIG. 11D, in one example the tips of the blades 219A are in contact with an inner surface 1111 of the stator housing 219C. Thus, the blades 219A of the stator are stationary. By contacting the blades 219A with the inner surface 1111 of the stator housing 219C, the position of each blade 219A may be static.

FIGS. 12A, 12B, 12C, and 12D respectively illustrate a perspective view, a front view, a side view, and a cross section view of a tail cone 221 of the propulsor fan 100 according to one example. The tail cone 221 may be configured to produce the correct change of area of the stator housing 219C using the air exits the propulsor fan 100 in one example. The tail cone 221 may be made of metal such as aluminum or titanium or may be made of a composite such as carbon fiber, or combinations thereof.

Figure 12A:
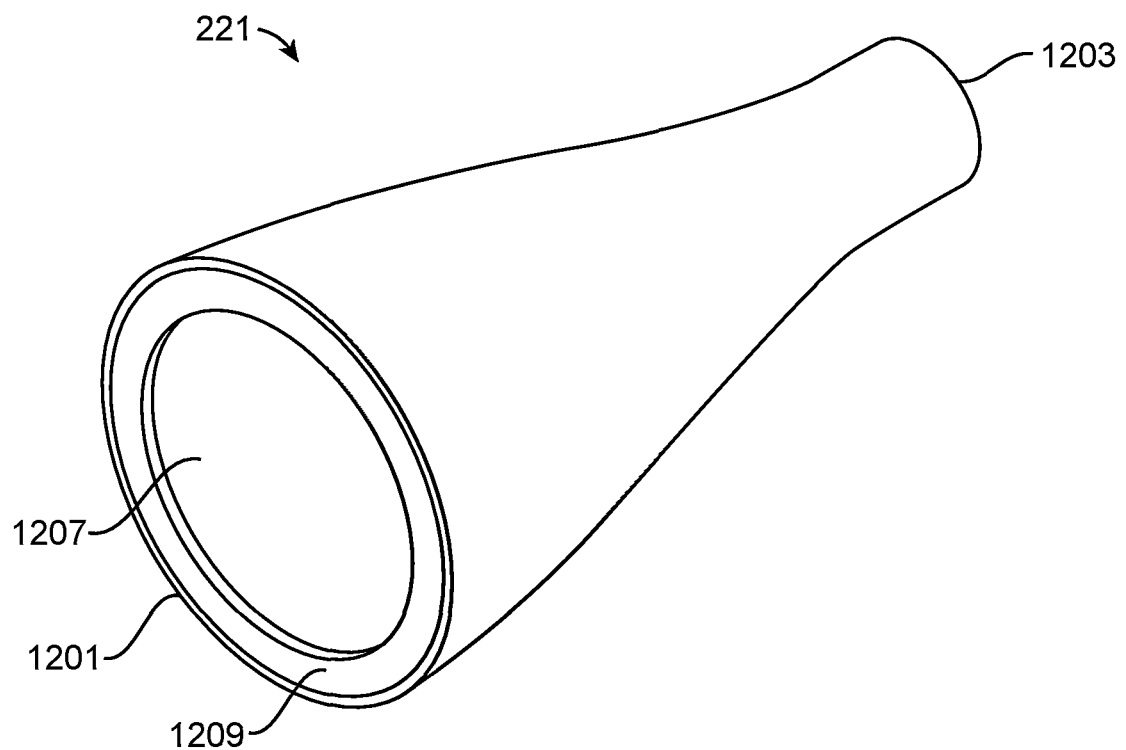
FIGS. 12A, 12B, 12C, and 12D respectively illustrate a perspective view, a front view, a side view, and a cross section view of a tail cone of the propulsor fan according to one example as described herein.
Figures 12B, 12C:
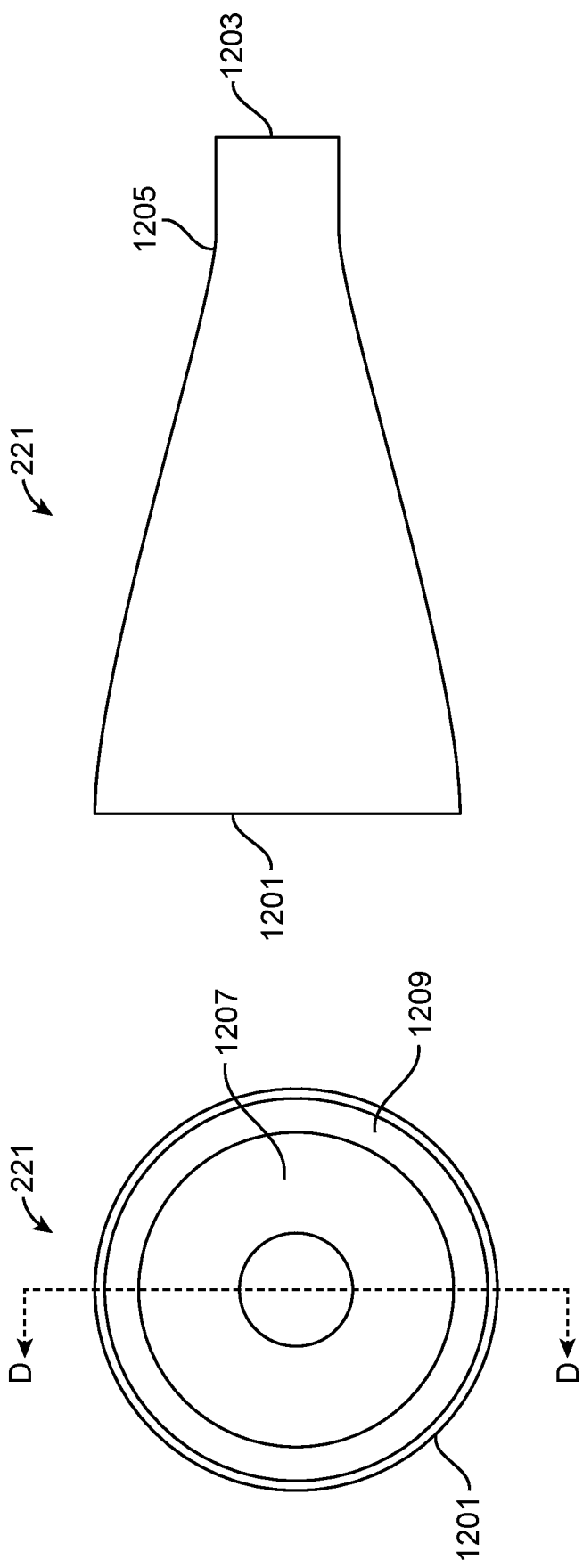

The tail cone 221 may include a first end 1201 (i.e., an inlet) and a second end 1203 (i.e., an outlet). In one example, the first end 1201 comprises a diameter that may be greater than a diameter of the second end 1203. In one example, the diameter of the tail cone 221 may be different across a length of the tail cone 221. As shown in FIG. 12C, the diameter of the tail cone 221 reduces from the first end 1201 towards the second end 1203 until an intermediate point 1205 is reached. From the intermediate point 1205 to the second end 1203, the diameter of the tail cone 221 may be relatively constant.

In one example, the first end 1201 of the tail cone 221 may be configured to connect to the second end 1103 of the motor housing 219B of the stator 219. Thus, the diameter of the second end 1201 of the tail cone 221 substantially matches a diameter of the second end 1103 of the motor housing 219B of the stator 219. In one example, the first end 1201 of the tail cone 221 may include a mounting surface 1209 that mates with the second end 1103 of the motor housing 219B. The mounting surface 1209 may be attached to the motor housing 219B using fasteners for example. However, other attachment mechanisms may be used in other examples.

Figure 12D:
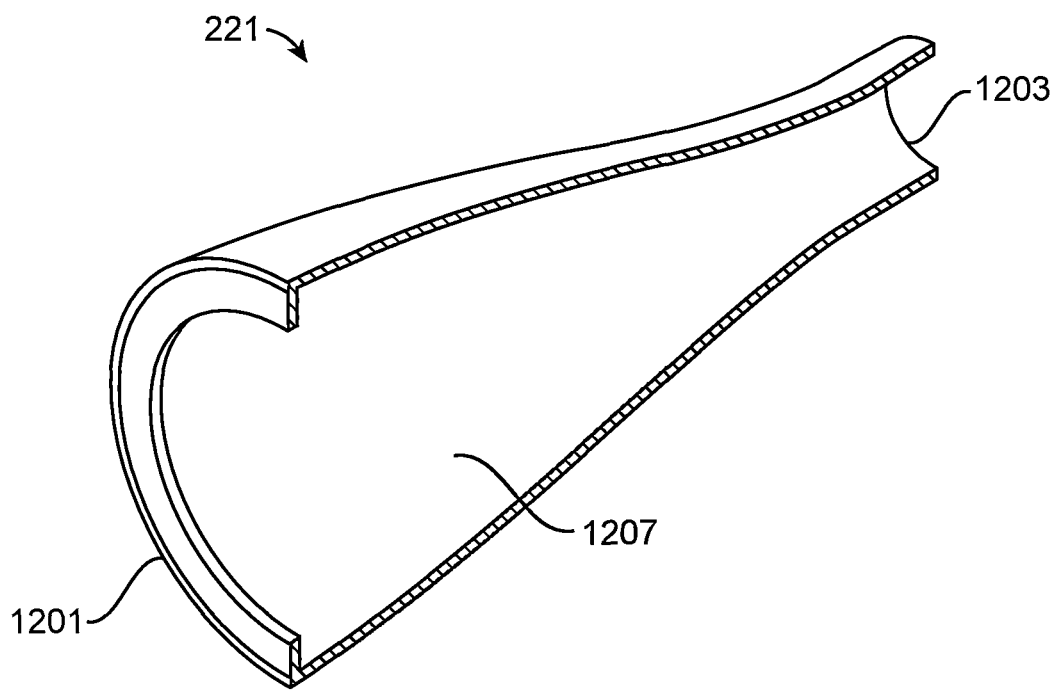

Referring to FIG. 12D, a cross-section view of the tail cone 221 along plane D-D' shown in FIG. 12B is shown. In one example, the tail cone 221 may include a cavity 1207 formed through the length of the tail cone 221 starting from the first end 1201 of the tail cone to the second end 1203 of the tail cone. Shaping of the aft end of the tail cone 221 may be governed by exhausted secondary flow from the interior of the tail cone 221 with respect to the expansion of the jet following a blade fan and/or a stator, for example, the bladed disk 209 and/or stator 219.

In one example, the propulsor fan 100 may include a center hub driven motor 215. That is, a single motor 215 may be used to drive the propulsor fan 100 in one example. An example motor used for the propulsor fan 100 is an electric motor. In some examples, the motor may be a brushless electric motor or an electric ducted fan (EDF). However, other types of motors such as a gas motor or jet turbine may be used in the propulsor fan 100 in other examples. Generally, different motor types and sizes may be used depending on the application of the propulsor fan 100.

Multi-Motor Drive System

Figure 13A:
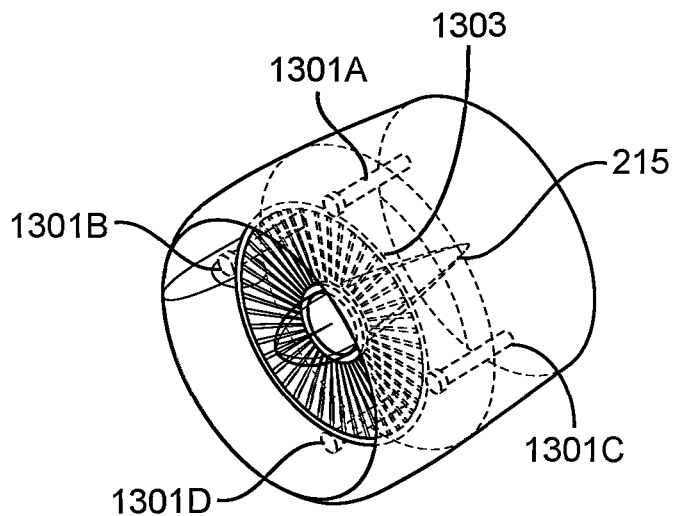
FIGS. 13A, 13B, and 13C respectively illustrate a perspective view, a front view, and a side view of a circumferential drive system of the propulsor fan according to one example as described herein.
Figure 13B:
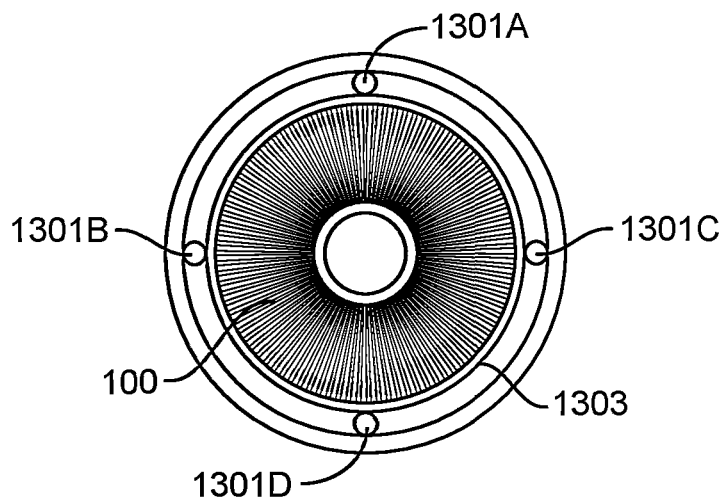
Figure 13C:
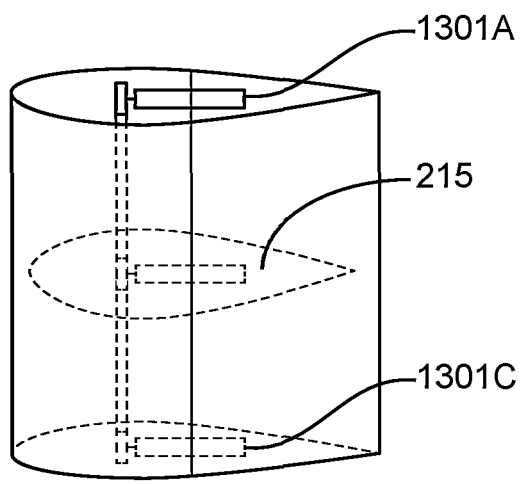

In another example, the propulsor fan 100 may be driven by a plurality of motors rather than just a single motor 215 described above. FIGS. 13A, 13B, and 13C respectively illustrate a perspective view, a front view, and a side view of a circumferential multi-motor drive system of the propulsor fan 100 according to one example.

Instead of driving thrust with a single motor 215, a plurality of auxiliary motors 1303A, 1303B, 1303C, and 1303D are placed within the body housing 217 to drive the blade fan 209 via a ring gear 1303. The plurality of auxiliary motors 1303 may be electric motors in one example. However, other types of motors may be used.

The ring gear 1303 may be connected to the tension ring 211 in one example. The auxiliary motors 1303 may replace the motor 215 described above or may be used in conjunction with the motor 215. Multi-motor redundancy allows for exceptional fault tolerance of the propulsor fan 100 system. With four auxiliary motors 1303 for example, the loss of a single auxiliary motor is nearly inconsequential to the propulsor's normal operation. Even with the loss of another motor, the remaining auxiliary motors 1303 may be powered to generate sufficient thrust.

As shown in FIGS. 13A to 13C, the auxiliary motors 1301A to 1301D are positioned radially around the circumference of the propulsor 100 rather than surrounding the hub 205 of the propulsor. The end of each auxiliary motor 1301 may include a gear that is connected to the ring gear 1303. The radial arrangement need not be limited to equal angular spacing. For example, the fan may be driven by three motors which are biased toward the lower quadrant of the duct. Furthermore, rather than requiring the stator 219 to support the hub 205 to support the centrally housed motor 215, the propulsor can leverage the duct structure itself to handle the auxiliary motors 1301 and the respective load as shown in FIG. 13C. In addition to removing weight and drag, this also results in less broadband noise typically caused by stator flow interaction. In one example, the auxiliary motors 1301 operate more at a high 20,000 RPM where they can generate a superior 15 kW/kg specific power compared to heavier, lower speed motors at a 5 kW/kg specific power. The auxiliary motors 1303 drive the ring gear 1303 in unison to eliminate gear slippage (axial and radial directions). This low bearing results in lower gear noise.

Figure 14:
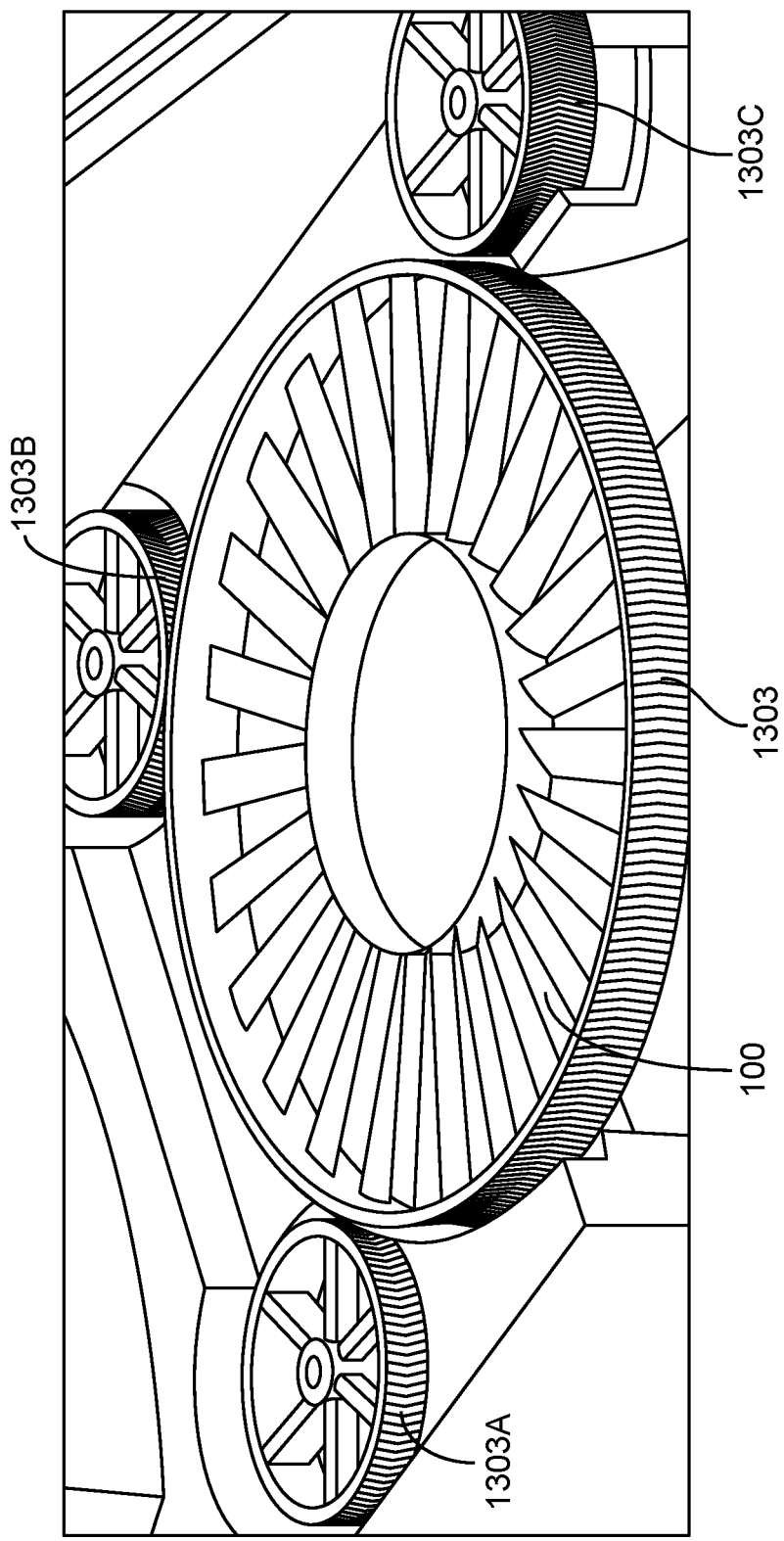
FIG. 14 illustrates a circumferential drive system of the propulsor fan according to another example as described herein.

FIG. 14 illustrates yet another example of the circumferential drive system of the propulsor fan 100 according to another example. The example shown in FIG. 14 is similar to the example described in FIGS. 13A-13C. However, the drive system shown in FIG. 14 omits the centrally driven motor 215 and relies upon the auxiliary motors 1303A-C for thrust generation.

Propulsor Array

Figure 15A:
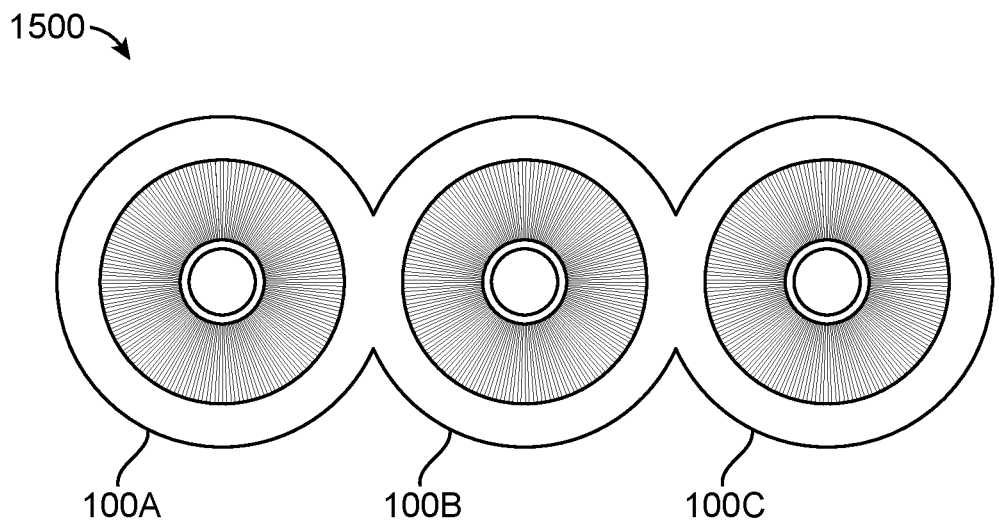
FIGS. 15A and 15B respectively illustrate a front view and a perspective view of an array of propulsor fans according to one example as described herein.
Figure 15B:
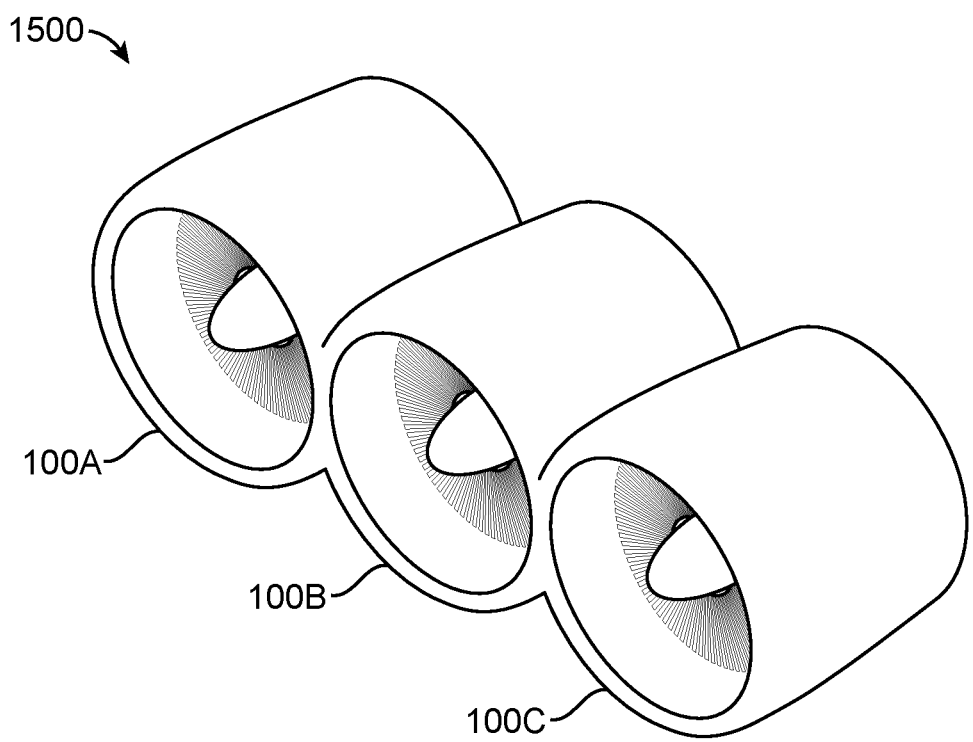

FIGS. 15A and 15B respectively illustrate a front view and a perspective view of an array of propulsor fans 1500 according to one example. In one example, the array of propulsor fans 1500 may include a plurality of propulsor fans 100 that are laterally arranged to form a row of propulsor fans. In the example shown in FIGS. 15A and 15B, the array of propulsor fans 1500 include a first propulsor fan 100A, a second propulsor fan 100B, and a third propulsor fan 100C. Each of the plurality of propulsor fans 100A to 100C may include the propulsor fan structure described herein. While three propulsor fans 100 are included in the array of propulsor fans 1500, the array may include any number of propulsor fans greater than two. In one example, the array of propulsor fans 1500 may be positioned within or on an aircraft wing, a fuselage, or a boom. In another example, the array of propulsor fans may be positioned above the wing, the fuselage, or the boom. In other examples, the array of propulsor fans may be positioned below the wing, the fuselage, or the boom. In other examples, the array of propulsor fans may be positioned such that the wing splits the exhaust flow with some proportion of air passing above and another proportion of air passing below.

Figure 16:
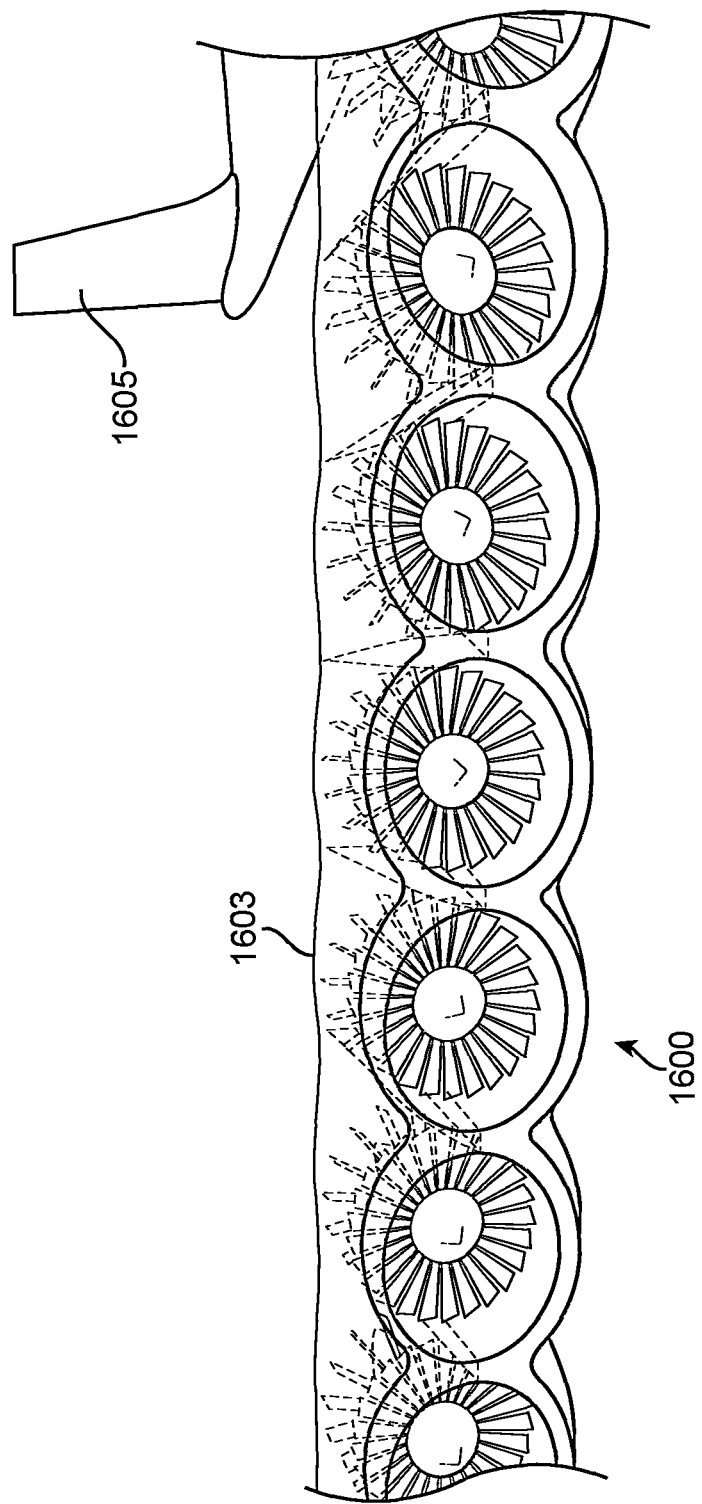
FIG. 16 illustrates an example application of an array of propulsor fans according to one example as described herein.

FIG. 16 illustrates an example application of an array of propulsor fans 1600 according to one example. As shown in FIG. 16, the array of propulsor fans 1600 may be integrated into a ducted wing 1603 of an aircraft 1605 in one example. Multiple propulsor fans 1600 may be combined laterally to form a ducted wing 1603. The ducted wing 1603 can be shaped to create a passive lifting biplane where biplane stagger, sweep, taper, and dihedral can be added as needed. The total number of propulsor fans and size of the propulsor fans to include in the array 1600 may be dependent on the requirements of the aircraft such as the number of passengers that will be on the aircraft, speed requirements, and altitude requirements of the aircraft 1605 for example.

The combination of the propulsor fans into an array 1600 opens up several control and thrust vectoring opportunities. Thrust can simply be varied between each individual propulsor fan 100 to induce yawing, rolling, or pitching moments. Relative spanwise pitch differences between the propulsor fans may be used to execute faster climbs and descents. Maneuverability may be further augmented with additional control surfaces installed at the trailing edge of the wing 1603.

The spanwise combination of ducts lend themselves well to integration along the wing 1603 or even as a biplane wing itself. The array 1600 may be arranged and extended as a biplanar wing with sweep, stagger, dihedral and taper to fit system needs. The choice to integrate the array of propulsor fans as a full biplanar wing may be dependent on the amount of thrust (minus drag) required as well as the relative size of the propulsor fan.

Parallel and Series Multi-Stage Electric Fan

A unique fan integration approach is described herein that enables unprecedented variation in blade fan 209 loading (e.g., 4:1), thus enabling a variable fan pressure approach where blade fan area and efficiency may be optimized for any flight condition in the envelope. The result is achieving nearly optimal FPR's at both hover and cruise conditions without new turbine engine development costs. In addition, the distribution enables a dramatic reduction in power system weight and thermal management issues.

An aircraft configured with the propulsion systems described herein may satisfy two directly opposing requirements. In one example, the requirements include a 400 knot infiltration/exfiltration dash or cruise along with a 10 min high/hot hover, while carrying a bulky 5,000 lb payload. Such requirements may be required by military operations or civilian commercial transport requirements. To meet the divergent requirements (e.g., a 400 knot cruise airspeed and the capability to hover), a high Disc-Loading (DL) or Fan Pressure Ratio (FPR) (e.g., 1.1-1.2) is necessary for the high-speed cruise, and a very low DL or FPR (e.g., 1.01-1.02) is necessary for an aircraft to hover. Such a capability necessitates at minimum a 4-10× propulsion system exhaust area variation. Previous efforts to meet such requirements suggested developing an aircraft having a convertible turboshaft-turbofan engine that could be used with a stowable tilt-rotor configuration. While such a configuration has been proposed for the past 30 years for V/STOL missions, this requires an extremely expensive and high-risk engine development and rotor stowage program.

The propulsion system and, in particular, the propulsor fan 100 described above is capable of achieving high-speed efficient cruise characteristics and the ability to articulate to redirect thrust to support V/STOL operations. In one example, a plurality of articulating propulsor fans may be arranged to efficiently redirect thrust allowing an aircraft to transition between CTOL flight modes and V/STOL flight modes. Moreover, the propulsion system and, in particular, the propulsor fan 100 is capable of achieving ultra-low noise characteristics. Key attributes include high blade count/high solidity fans that operate at low tip-speed with a shroud around the blade tips that eliminates tip losses. This approach results in blade passage frequencies (BPF) that are nearly ultrasonic, so that tonal noise cannot be heard and is dissipated quickly in the atmosphere. The topological features of the fan also make it more distortion tolerant than conventional ducted fans providing greater flexibility with airframe integration and operation.

In one example, a plurality of propulsor fans, for example 16 propulsor fans, may be integrated into a distributed propulsion system capable of both parallel and series thrust modes. In one example, the parallel thrust mode allows for hover and/or V/STOL flight operations whereas the series mode allows for cruise and/or CTOL flight operations.

Figure 17A:
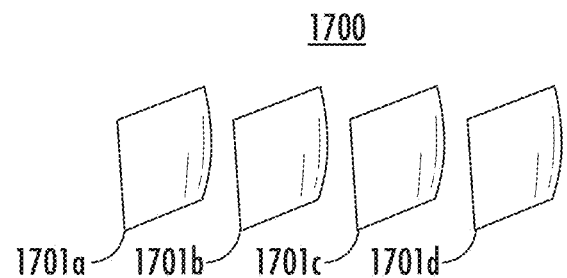
FIG. 17A illustrates a first position of a distributed propulsion system for a vertical takeoff and landing (VTOL) mode (i.e., hover mode) according to one example as described herein.
Figure 17B:
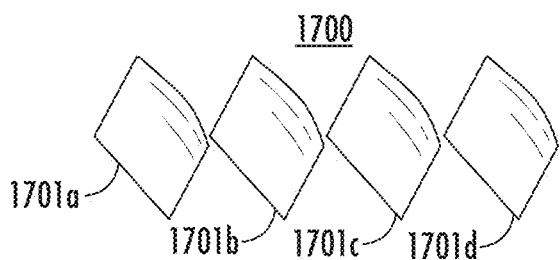
FIG. 17B illustrates a second position of the distributed propulsion system for a short takeoff and landing mode (STOL) mode according to one example as described herein.
Figure 17C:
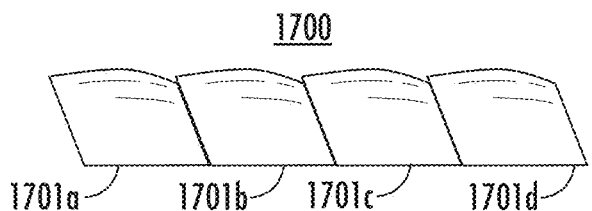
FIG. 17C illustrates a third position of the distributed propulsion system for a cruise mode or conventional takeoff and landing (CTOL) mode according to one example as described herein.

FIGS. 17A to 17C illustrate one example of the distributed propulsion system 1700 including a plurality of propulsor fans 1701. An example of the propulsor fan 1701 used in the distributed propulsion system 1700 may be the propulsor fan 100 described above. However, different propulsor fans may be used. In one embodiment, at least one propulsor within the distributed propulsion system 1700, or other propulsion system disclosed herein, comprises a shrouded fan. In certain embodiments, every propulsor in a group of propulsors such as propulsors 1701a-1701d comprises a shrouded fan. Certain embodiments relate to crafts without any unshrouded fans.

In one example, the distributed propulsion system 1700 comprises a plurality of propulsors 1701 (each providing roughly 600 lbf statically in some examples) that are capable of articulating to operate at and between different positions. As shown in FIGS. 17A-17C, the distributed propulsion system may include at least four propulsors 1701a-d. In one example, the distributed propulsion system 1700 may include at least two propulsors 1701, such as for example, 1701a and 1701b or 1701a and 1701c as a few non-limiting illustrative examples. Again, each of the propulsors 1701a-1701d may be capable of articulating to operate at and between different positions to redirect thrust as required to support different flight modes. Articulating one or more of the positions of propulsors 1701a-d or other propulsors disclosed herein may be based on, at least in part, an input, output, calculation and/or determination of a computer, such as for example flight control computer 2400 described below in relation to FIG. 24. Example positions that one or more propulsors, such as propulsors 1701a-d may be articulated into may include a first position. As such, FIG. 17A may depict a first mode in which the at least a portion of the propulsors (1701a-1701d) are in a "parallel position that is substantially perpendicular to the horizontal axis. In the depicted embodiment of FIG. 17A, all four of the depicted propulsors (1701a-1701d) are depicted in a vertical parallel position perpendicular to the horizontal axis, such configuration may be useful, such as for example, a hover mode and/or a vertical takeoff and landing mode o.

FIG. 17B depicts a second position (e.g., an "intermediate position"), which may be used following or prior to a parallel position, and yet in other embodiments, one or more propulsors 1701a-d may be articulated to the configuration shown in FIG. 17B without any immediate prior or subsequent duration at a parallel position for any meaningful period of time (e.g., the propulsor may temporarily or momentarily be within the parallel position as it articulates around an axis to a final articulation point). In one embodiment, propulsors 1701a-1701d may be articulated to be in the configuration in FIG. 17B for a short takeoff and landing mode of the aircraft. FIG. 17C depicts a third position (e.g., a "series position") which may be used following or prior to the second position, and yet in other embodiments, may be used without first or later being in the second position (e.g., the propulsor may only temporarily or momentarily be within the intermediate position as it articulates around an axis to a final articulation point but not remain there). The configuration depicted in FIG. 17C may be used for a cruise mode and/or a conventional takeoff and landing mode of the aircraft in certain embodiments.

Although FIGS. 17A-17C may depict actual articulation points in certain embodiments covered herein, those skilled in the art with the benefit of this disclosure will appreciate that the still drawings depicted in the FIGS. are not intended to limit the scope of other embodiments. As some examples, in the parallel position described in relation to FIG. 17A, one or more (including all) of the propulsors in a group, such as propulsors 1701a-d, may generally be positioned from about an angle above 35 degrees to about an able less than 105 degrees relative to a linear direction along the length of the aircraft fuselage. In yet other embodiments, at least a portion (or all) of the propulsors 1701a-d may be positioned between 40 and 100 degrees relative to a linear direction along the length of the aircraft fuselage. In yet further embodiments, at least a portion (or all) of the propulsors 1701a-d may be positioned between 45-90 degrees relative to a linear direction along the length of the aircraft fuselage for this configuration. In certain uses cases, the parallel position may be used for the VTOL mode to redirect thrust in a downward vector.

In the intermediate position described in relation to FIG. 17B, the propulsors 1701a-d may merely be a short duration transition characterized by constant rotation. Depending on the embodiment, such a configuration may articulate one or more propulsors (1701a-d) during V/STOL and/or CTOL operations. In various embodiments, at least a portion (or all) of the propulsors 1701a-d may be positioned between 0-50 degrees relative to a linear direction along the length of the aircraft fuselage. In certain embodiments, at least a portion (or all) of the propulsors (1701*a-d*) may generally be positioned from about 20-60 degrees relative to a linear direction along the length of the aircraft fuselage. An intermediate position may be used when transitioning between the VTOL mode and the CTOL mode. In the series position, such as described in FIG. 17C, at least a portion (or all) of the propulsors 1701*a-d* may be positioned greater than 1-15 degrees to about less than 15 degrees relative to a linear direction along the length of the aircraft fuselage. In certain embodiments, at least a portion (or all) of the propulsors 1701*a-d* may be positioned between −10 to about 10 degrees relative to a linear direction along the length of the aircraft fuselage. In some embodiments, at least a portion (or all) of the propulsors 1701*a-d* may be positioned between 0-10 degrees generally parallel relative to a linear direction along the length of the aircraft fuselage. A series position may be used in certain embodiments for a CTOL mode to redirect thrust in a vector generally parallel to a linear direction along the length of the aircraft fuselage or flight path. With respect to the above positions having ranges, those skilled in the art will appreciate that in some embodiments, all or multiple propulsors in a group (such as propulsors 1701*a-d*) will each be actuated to about the same angle within the range for a particular intended configuration. For example, upon configuring multiple propulsors in a group to a "parallel position," multiple propulsors may be configured to be articulated to about the same angle. In yet another embodiment, different propulsors within the group may be positioned to different angles within a range threshold. For example, a first propulsor may be articulated to an 80-degree angle and a second propulsor may be articulated to a 100-degree angle. Operational parameters relating to the articulation of one or more propulsors may be based on or more factors. For example, the final angle that one or more propulsors are articulated to during a particular instance of implementing a positional configuration, whether one or more propulsors are articulated at a variable rate, the variable or constant rate implemented, and other operational parameters may be set or adjusted in accordance with certain embodiments disclosed herein. As some examples, one or more operational parameters for articulating propulsors may be based on one or more factors, including but not limited to: a desired speed or acceleration along one or more directions (inclusive of a reduction of acceleration or velocity), weather parameters, including but not limited to wind direction or speed, weight or weight distribution of the craft or portion of the craft, amongst others. In certain embodiments, a computer, such as flight control computer 2400 shown in FIG. 24 may control the articulation and/or determine one or more operational parameters for one or more propulsors.

As shown in FIGS. 17A to 17C, the propulsor fans 1701*a-d* may be configured to articulate between the different positions for the different modes of the aircraft. The articulating propulsor fans 1701*a-d* may be actuated by an aircraft mounted actuator. In one example, the propulsor fans 1701 may be commonly actuated. In another example, propulsor fans 1701 may be independently actuated. In another example, propulsor fans 1701 may be articulated commonly or individually to control aircraft yaw, pitch, and roll. A fuselage mounted actuator may articulate propulsors 1701 as an assembly, with multiple assemblies mounted on the aircraft to achieve all axis control. In one example, a secondary propulsor fan actuator may provide a redundant system for the primary actuator. Actuation of propulsors (whether it be independent or common actuation) may be critical to ensure proper flight during certain modes. For example, during what is considered slow flight (in for example, V/STOL flight). each propulsor may turn the airflow. A first propulsor, such as a forward-most propulsor (e.g., propulsor 1701*a*) in a group of arranged propulsors (propulsors 1701*a*-1701*d*) encounters generally undisturbed airflow while the following (e.g., the more aft positioned) propulsors may be actuated to obtain a progressively greater downwash that should require progressively steeper rotation angles. In one embodiment, a plurality of propulsors may be commonly actuated (mechanically and/or electronically), however, may be actuated at different rates. For example, for each 5 degrees a first propulsor in a group (e.g., propulsor 1701*a*) is actuated in a first direction, a second propulsor (e.g., propulsor 1701*b*) may be rotated 7 degrees. Those skilled in the art with the benefit of this disclosure will appreciate that there are merely examples for illustrative purposes, and other quantities may be implemented. In certain implementations, the actuation of one propulsor may result in the actuation of at least another propulsor in the group (or another group) by a factor. For example, a control signal directing the actuation of propulsor 1701*a* by a first amount along a first direction, may result in the actuation of one or more actuators 1701*b-d*) in accordance with a first or second factor. In one embodiment, actuation of propulsor 1701*a* to a number of degrees in a first direction or to a final degree location may result in increasing number of degrees for each progressive propulsor in the group with respect from the direction travelling from a forward end of the aircraft to an aft end. In one embodiment, this may be accomplished via a commonly actuation such that a gain ensures coordinated (linked) rotation that gets progressively steeper for each following propulsor. In yet other embodiments, each propulsor may be independently actuated. Although such embodiments have been explained with respect to a first direction, this disclosure envisions actuating propulsors in multiple directions along multiple axes. For example, with respect to a vertical plane, actuation of a propulsor in a first direction along a first axis may rotate the propulsor in a clockwise direction, and actuation of the propulsion in a second direction along that first axis may rotate the propulsor in a counterclockwise direction. In another embodiment, the same or another propulsor may be actuated with respect to another plane or axis. For example, one or more propulsors may actuated along a second vertical plane that is perpendicular the first vertical plane, which may also be generally perpendicular with the length of the fuselage. In this regard, with respect to the second vertical plane, actuation of a propulsor in a first direction along a first axis may rotate the propulsor in a clockwise direction, and actuation of the propulsion in a second direction along that first axis may rotate the propulsor in a counterclockwise direction. It is envisioned that one or more propulsors may be selectively actuated to be actuated with respect to multiple axes. Further, although certain actuations may involve rotating one or more propulsors, other embodiments may actuate with respect to a linear movement in one or more directions. For example, one or more propulsors may be actuatable to be moveable along a horizontal or vertical direction or combinations thereof.

Figure 17D:
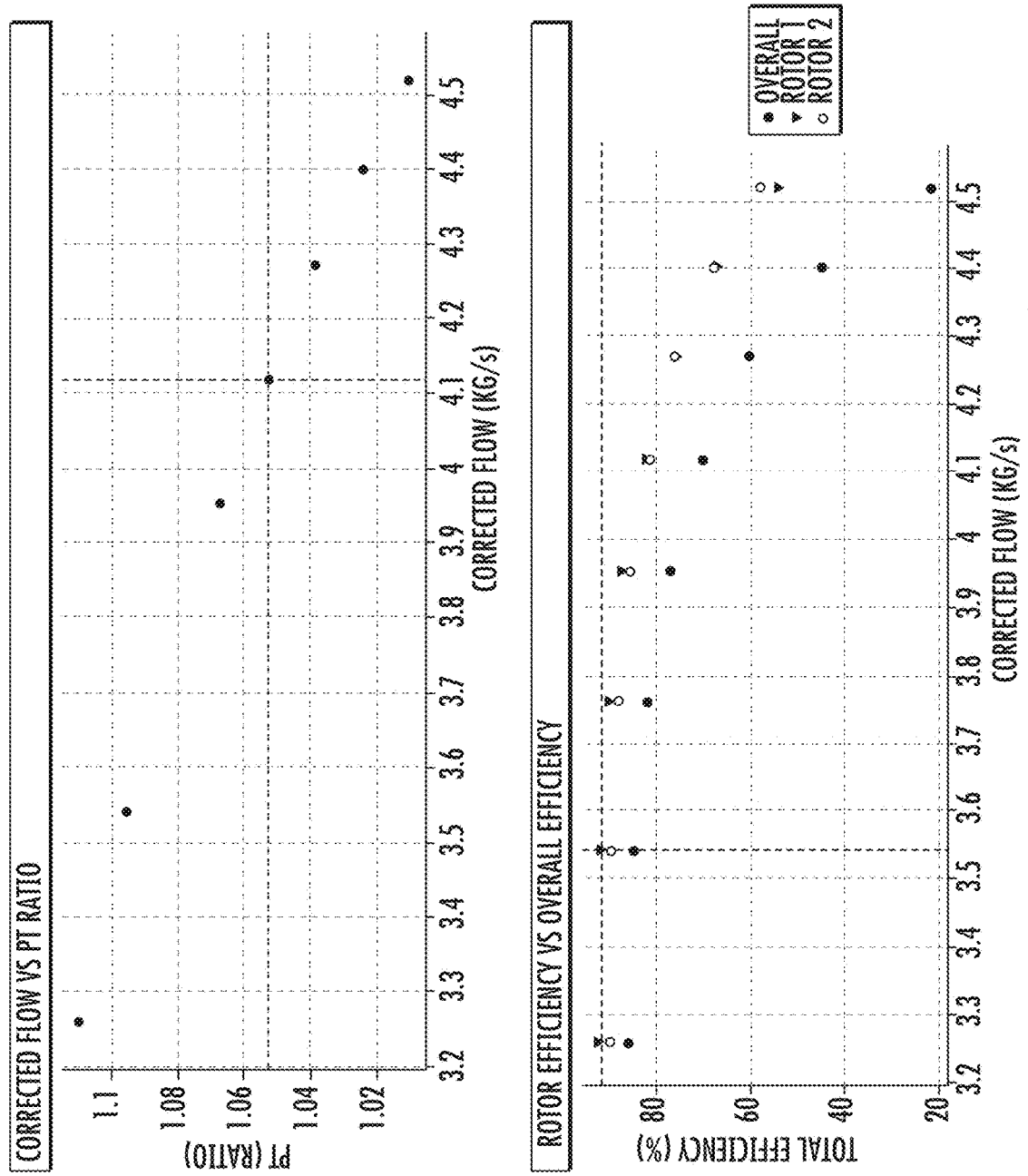
FIG. 17D graphically depicts simulated performance data of the third position of the distributed propulsion system for a cruise mode or CTOL mode of FIG. 17C.

In other examples, propulsor fans 1701 may be mounted on an aircraft wing or boom and articulated with a mechanical actuator linkage. In one example, the inlet of the propulsor fans 1701 may be scarfed or angled with an upper lip protruding forward of a lower inlet lip. In one example, as shown in FIG. 17C, the exhaust of the first or upwind propulsor fan 1701 may be aligned with the inlet of the second or downwind propulsor fan 1701. The scarfed or angled upper lip assists in physically clearing the propulsor fan 1701 exhausts and nozzles from physically contacting each other during rotation or articulation. Each of the propulsor fan 1701 exhausts or nozzles may be aligned or inserted into the inlet of each downwind or aft propulsor fan 1701 to increase the mass flow resulting in increased thrust in a CTOL flight mode as shown in FIG. 17C. As shown in FIG. 17D, a simulated FPR of greater than 1.1, for the lowest flow rate, was achieved with an example four propulsor fan linear configuration as shown in FIG. 17C.

In one example, the four-stage distributed propulsion system 1700 provides a greater FPR variation for optimum matching at hover and cruise conditions compared to a two-stage system while retaining low tip speeds in all phases of flight to achieve extremely low noise. Each fan stage, in this example, can operate independently in hover with a FPR of 1.03, or rotate to feed each additional propulsor fan in a series, linearly aligned, while varying the blade pitch or inlet guide vanes in some examples, to multiply each fan pressure ratio together to achieve a 1.12 FPR during a 400-knot cruise in a CTOL flight mode. In one example, one or more of the propulsor fans 1701 may be idled during a flight mode change rotation with a temporary glide or whether the inlet distortion can be sufficiently managed via inlet guide vanes (IGVs) or variable pitch blades to permit thrust during rotation.

Prior art V/STOL capable aircraft have typically suffered from severely reduced payload fractions primarily due to the weight of the power systems required to achieve hover capability. A significant advantage of distributed electric propulsion approaches like those described herein is that the electric motor/controller weight scales as a function of 1/sqrt (number of motors). As an example, compared to a single electric motor with power required to lift an 8,000 lb aircraft, a 16-motor propulsion system will have approximately 4× less motor weight. While this does not account for actuation, linkages, and many other secondary weights, as far as primary weight drivers are concerned, the distributed propulsion system as described herein offers an opportunity for significant weight savings. Distribution also offers increased power system robustness to enable reduced component criticality and potentially improved operational safety.

Figure 18A:
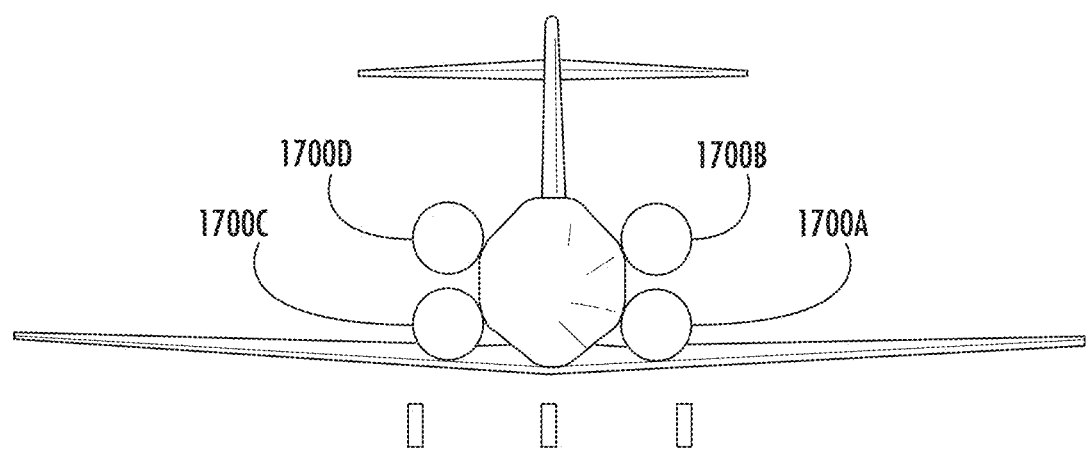
FIG. 18A illustrates a front view of an aircraft with the distributed propulsion system according to one example described herein.
Figure 18B:
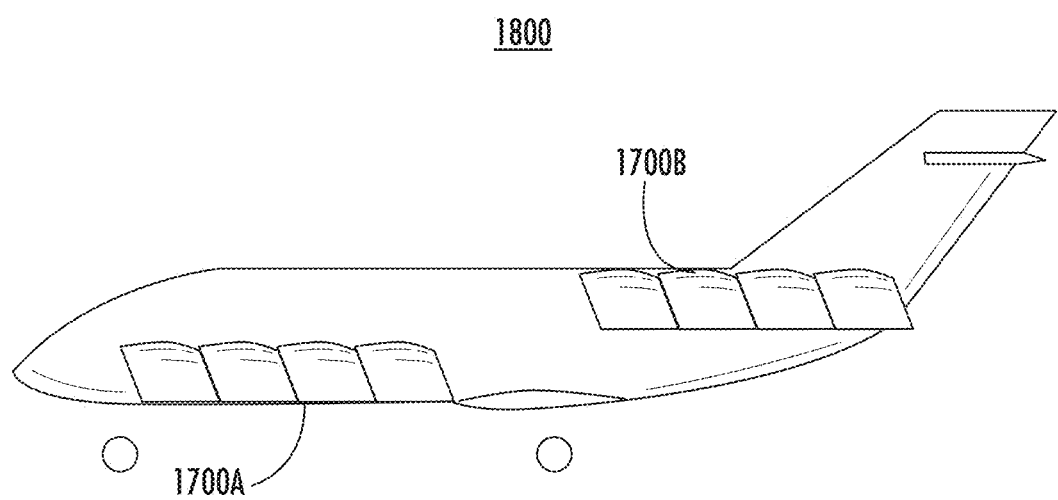
FIG. 18B illustrates a side view of the aircraft with the distributed propulsion system in the third position for the cruise mode of the aircraft according to one example as described herein.
Figure 18C:
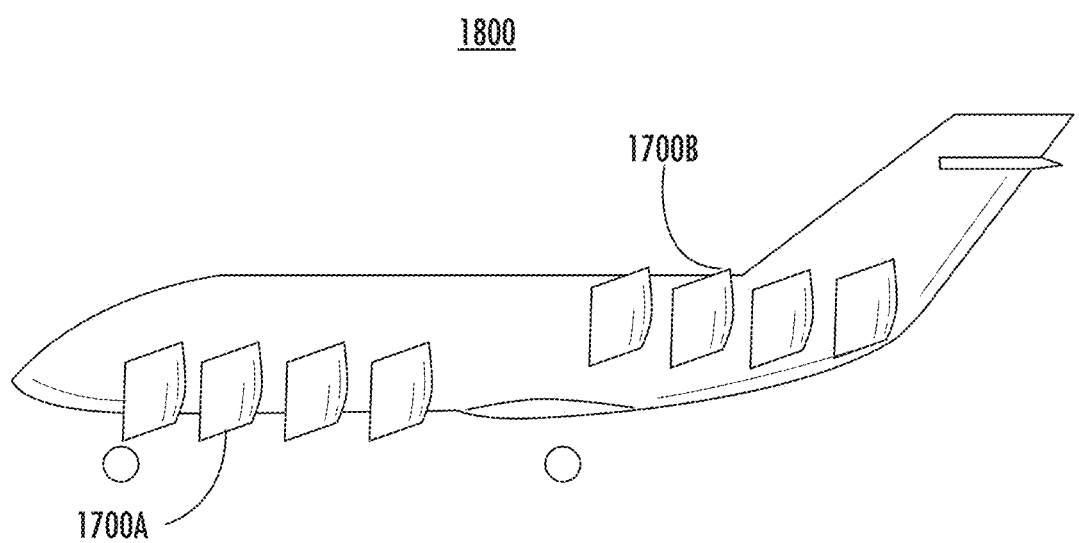
FIG. 18C illustrates a side view of the aircraft with the distributed propulsion system in the first position for the VTOL mode of the aircraft according to one example as described herein.

FIGS. 18A, 18B, and 18C illustrate different views of an aircraft 1800 that incorporates the distributed propulsion system 1700. Specifically, FIG. 18A illustrates a front view of the aircraft 1800, FIG. 18B illustrates a side view of the aircraft 1800 with the distributed propulsion system 1700 in the third position (i.e., series position) for cruise and/or CTOL flight operations, and FIG. 18C illustrates a side view of the aircraft 1800 with the distributed propulsion system 1700 in the first position (i.e., parallel position) for hover and/or V/STOL flight operations.

As shown in FIGS. 18A, 18B, and 18C, an example aircraft 1800 includes four distributed propulsion systems 1700A-D attached to the fuselage of the aircraft 1800. The distributed propulsion systems 1700A-D, in this example, are arranged in a quad post configuration. Specifically, the aircraft 1800 may include a first distributed propulsion system 1700A at a first side (i.e., a left side) of the aircraft 1800 near the front portion of the fuselage, a second distributed propulsion system 1700B at the first side of the aircraft 1800 near the aft portion of the fuselage or downwind from the first distributed propulsion system 1700A, a third distributed propulsion system 1700C at a second side (i.e., right side) of the aircraft 1800 and opposite the first distributed propulsion system 1700A, and a fourth distributed propulsion system 1700D at the second side of the aircraft 1800, and opposite the second distributed propulsion system 1700B. In some examples, distributed propulsion systems 1700A and 1700C may be commonly actuated to facilitate flight in CTOL or V/STOL flight modes. In another example, distributed propulsion systems 1700B and 1700D may be commonly actuated to facilitate flight in CTOL or V/STOL flight modes. In yet another example, distributed propulsion systems 1700A, 1700B, 1700C, and 1700D may be commonly or independently actuated to facilitate flight in CTOL or V/STOL flight modes.

As shown in FIGS. 18B and 18C, the distributed propulsion system 1700A may be located at a first end of the fuselage of the aircraft 1800 forward from the main inboard wing on the first side of the aircraft 1800 whereas the distributed propulsion system 1700B may be located at a second end of the fuselage of the aircraft 1800 that may be aft of the main inboard wing on the first side of the aircraft 1800. Similarly, the distributed propulsion system 1700C may be located at the first end of the fuselage of the aircraft 1800 forward from the main inboard wing at the side of the aircraft 1800 whereas the distributed propulsion system 1700D may be located at the second end of the fuselage of the aircraft 1800 that may be aft of the main inboard wing on the second side of the aircraft 1800.

As shown in FIG. 18B, the first distributed propulsion system 1700A and the second distributed propulsion system 1700B may be vertically staggered, offset, or stacked from each other at the first side of the aircraft 1800 such that the first distributed propulsion system 1700A may be closer to a lower surface of the fuselage than the second distributed propulsion system 1700B, whereas the second distributed propulsion system 1700B may be closer to an upper surface of the fuselage than the first distributed propulsion system 1700A. As a result, the outlet of the last propulsor fan included in the first distributed propulsion system 1700A is not aligned with the inlet of the first propulsor in the second distributed propulsion system 1700B. This allows for the second distributed propulsor system 1700B to receive clean air during cruise and/or CTOL flight operations of the aircraft 1800. The third distributed propulsion system 1700C and the fourth distributed propulsion system 1700D may also be vertically staggered, offset, or stacked from each other at the second side of the aircraft 1800 in a similar manner. Other distributed propulsion system 1700A-D configurations are possible. For example, first distributed propulsion system 1700A may be closer to an upper surface of the fuselage than the second distributed propulsion system 1700B, whereas the second distributed propulsion system 1700B may be closer to a lower surface of the fuselage than the first distributed propulsion system 1700A, and the third distributed propulsion system 1700C may be closer to an upper surface of the fuselage than the fourth distributed propulsion system 1700D, whereas the fourth distributed propulsion system 1700D may be closer to a lower surface of the fuselage than the third distributed propulsion system 1700C.

As also shown in FIG. 18B and discussed above, while the distributed propulsion systems 1700A to 1700D are in the third position (e.g., "series position") for cruise and/or CTOL flight operations, the outlet of at least one of the propulsor fans 1701 in each distributed propulsion system 1700A to 1700D may be inserted into the inlet of another one of the propulsor fans 1701 included in the distributed propulsor system 1700 to create a series arrangement of the propulsor fans 1701. The propulsor fans 1701 are oriented as shown in FIG. 18B, the direction for generated thrust in CTOL flight operations is along the length of the aircraft (e.g., parallel with an axis that extends along the length of the aircraft/fuselage). In contrast, as shown in FIG. 18C, while the distributed propulsion systems 1700A to 1700D are in the first position for hover and/or V/STOL flight operations, the propulsor fans 1701 may be rotated at a maximum angle (e.g., 90 degrees relative to a linear direction along the length of the fuselage) of the propulsor fans 1701 such that the outlet of at least one of the propulsor fans 1701 in each distributed propulsion system 1700A to 1700D is no longer inserted into the inlet of another one of the propulsor fans 1701 to create the parallel arrangement of the propulsor fans 1701. When the propulsor fans are oriented as shown in FIG. 18C, the direction of thrust for generated thrust in V/STOL flight operations is oblique/perpendicular relative to the length of the aircraft (i.e., oblique/perpendicular to an axis that extends along the length of the aircraft/fuselage).

Figure 21:
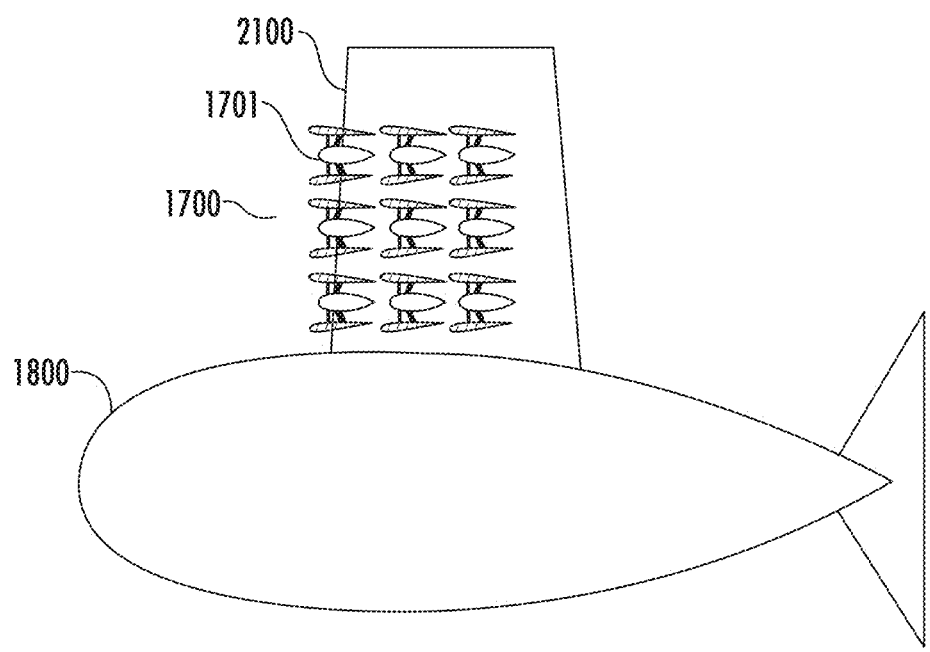
FIG. 21 illustrates the distributed propulsion system integrated into a main inboard wing according to one example as described herein.

In the examples shown in FIGS. 18A to 18C, the distributed propulsion systems 1700A to 1700D are attached to the fuselage of the aircraft 1800. In other examples, the distributed propulsion systems 1700 may be integrated into the main inboard wing 2100 such as at the leading edge of the main inboard wing as shown in FIG. 21, or integrated/attached to a boom.

In one example, the last propulsor fan 1701 in the distributed propulsion system 1700 may include a variable nozzle or extendable flaps to control mass flow through the plurality of propulsor fans or to directionally control thrust, whereas the propulsor fans 1701 that are upwind from the last propulsor fan 1701 may have a fixed exhaust size that may be sized for V/STOL flight operations. In one example, the last propulsor in the distributed propulsion system 1700 may have a variable nozzle through a plug nozzle, axisymmetric nozzle, 2D flap nozzle, etc.

Figure 19B:
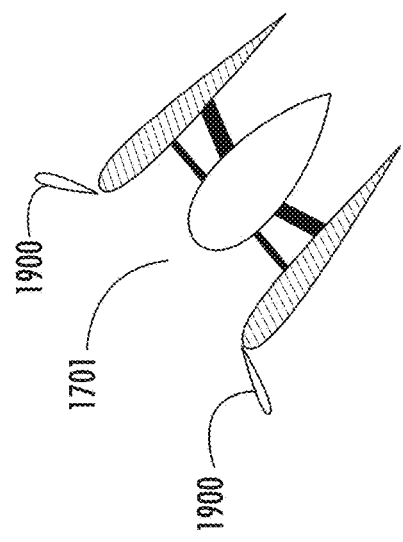
FIGS. 19A, 19B, 19C, and 19D illustrate a variable inlet of a propulsor or series of propulsors according to one example as described herein.
Figure 19D:
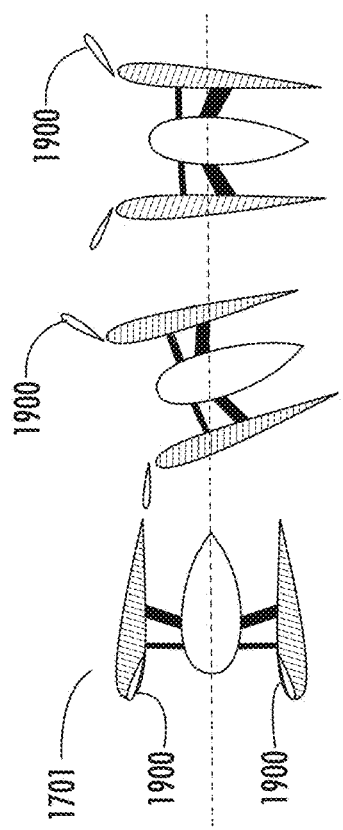
Figure 19A:
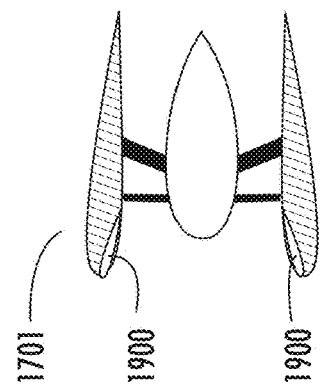

As shown in FIGS. 19A and 19B, one or more propulsor fans 1701 may include deployable flaps or slats 1900 around a circumference of the inlet of the propulsor fan 1701 to control mass flow through the plurality of propulsor fans and to increase air intake. In one example, the deployable flaps or slats 1900 may be a part of the scarf inlet of propulsor fan 1701. In another example, deployable flaps or slats 1900 may include a series of sectional components movably attached to the scarf inlet via one or more actuators. FIG. 19A illustrates the slats/flaps 1900 at a first position during CTOL flight operations. The flaps 1900 are retracted or stowed in the first position. In contrast, during V/STOL flight operations, the flaps or slats 1900 are in a second position where the flaps/slats 1900 are deployed (i.e., extended or opened) to improve inflow to the propulsor fan 1701 as shown in FIG. 19B when conducting V/STOL flight operations and a larger intake area is more advantageous to vertical/hovering flight modes. In another example, propulsor fan 1701 may be configured with auxiliary doors or suck-in doors to increase intake radius and flow area while placing the stagnation point of airflow on the revealed inlet lip during V/STOL flight operations.

Figure 19C:
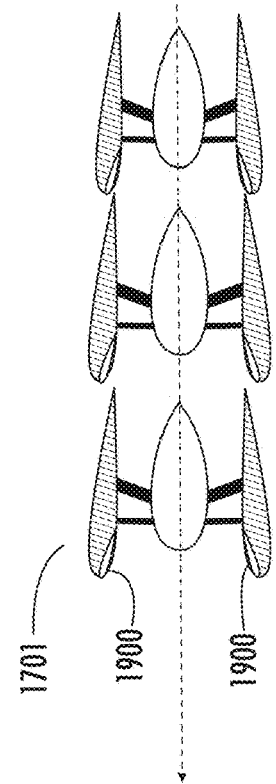

As shown in FIG. 19C, and previously discussed, a series or row of propulsor fans 1701 may be positioned in line axially along the aircraft fuselage, as shown by the segmented arrow, with each other to improve mass flow and thrust. An exhaust of the first and second propulsor fans 1701, as shown in FIG. 19C, may be inserted into, abut, or otherwise align with an inlet of a rearward positioned propulsor 1701 such that the exhaust of the first propulsor fan 1701 is configured to feed the scarf inlet of the second propulsor fan 1701, and the exhaust of the second propulsor fan 1701 is configured to feed the scarf inlet of the third propulsor fan 1701, and so on. As shown in FIG. 19D, the flaps/slats 1900 of propulsor 1701 may be configured to deploy or extend to an open position only when propulsor 1701 is rotated to a point where extension of flaps/slats 1900 is geometrically/physically clear of the outlet, exhaust, or nozzle of the forward propulsor 1701. Similarly, the flaps/slats 1900 of propulsor 1701 may be configured to retract to a stowed position so the propulsor 1701 may be rotated without contacting the outlet, exhaust, or nozzle of the forward propulsor 1701. In one example, the forward propulsor 1701 may articulate into a V/STOL flight mode position first, before a downwind propulsor 1701. Such a configuration prevents disruption of airflow into a downwind propulsor 1701 if rotated to a V/STOL flight mode configuration. In one example, the series of propulsor fans 1701 may be commonly articulated or rotated. In other examples, the series of propulsor fans 1701 may be individually articulated or rotated.

FIGS. 20A and 20B illustrate extendable flaps 2000 for a propulsor fan 1701. In one example, the extendable flaps 2000 may be configured optimize thrust in the CTOL flight mode and in the V/STOL flight mode. One or more propulsor fans 1701 may include extendable flaps 2000 around a circumference of the outlet/exhaust of the propulsor fan 1701. FIG. 20A illustrates the extendable flaps 2000 at a first or retracted position during the CTOL flight mode. The extendable flaps 2000 may generally be in a default retracted position during flight operations and, in particular, during CTOL operations to generally provide linear thrust along the length of the fuselage. In contrast, as shown in FIG. 20B, during V/STOL flight operations, the extendable flaps 2000 may be in a second position where the extendable flaps 2000 are angled downward to change a direction of thrust in various directions away from a linear path along the fuselage.

As shown in FIG. 20C, extendable flaps 2000 of propulsor 1701 may be configured to deploy or extend only when propulsor 1701 is rotated to a point where extension of extendable flaps 2000 are geometrically/physically clear of the scarf inlet of the rearward propulsor 1701. Similarly, the extendable flaps 2000 of propulsor 1701 may be configured to retract to a stowed position so the propulsor 1701 may be rotated without contacting the scarf inlet of the rearward propulsor 1701. In one example, the extendable flaps 2000 may also function as a variable nozzle.

As shown in FIG. 21 and discussed above, the distributed propulsion systems 1700 may be integrated into or above an aircraft wing 2100. In one example, distributed propulsion systems 1700 may be incorporated into the bottom of an aircraft wing 2100.

Figure 22:
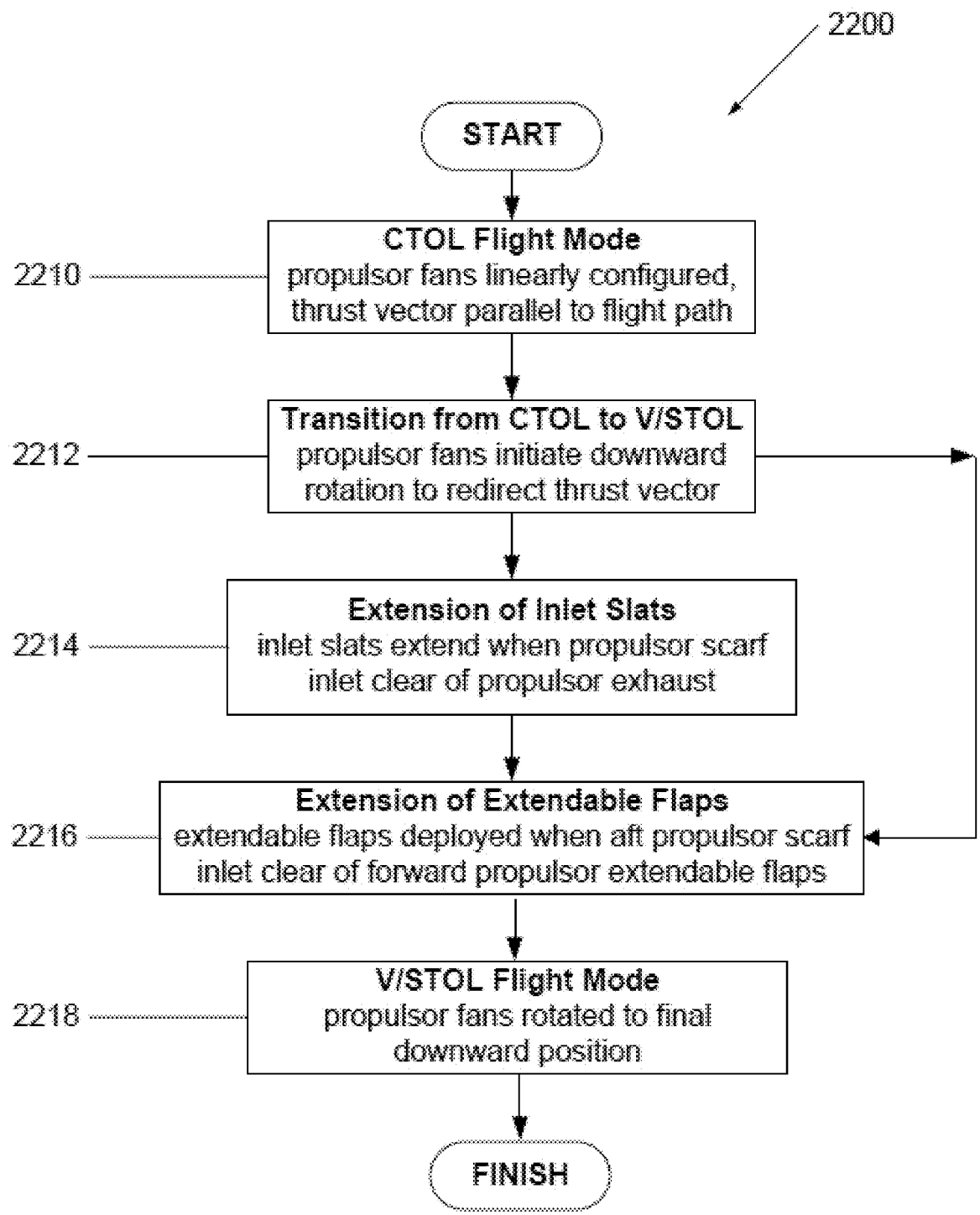
FIG. 22 depicts an example flow for controlling thrust direction when transitioning from a CTOL flight mode to a vertical and/or short takeoff and landing (V/STOL) flight mode according to various aspects described herein.

As depicted in FIG. 22, the series of thrust-generating propulsors, which may be propulsor fans, may be rotated or articulated via flowchart 2200 to redirect thrust to provide an aircraft the capability to transition from a CTOL flight mode to a V/STOL flight mode. At block 2210, an aircraft may be in a CTOL flight mode with a series of propulsor fans aligned linearly, as described above, in which the thrust vector may be generally parallel with the aircraft flight path. At block 2212, the aircraft begins transition to a V/STOL flight mode and the series of propulsor fans begin a downward rotation to redirect the thrust vector. At block 2214, if the propulsor fans are configured with inlet slats, the inlet slats extend to increase inlet airflow. The inlet flaps may extend, or extend to a first location, when the propulsor fan has rotated to a point in which the inlet flaps will not physically contact a forward propulsor fan exhaust. At block 2216, if the propulsor fans are configured with extendable flaps, the extendable flaps extend or deploy when the extending flap will not physically contact an aft positioned propulsor fan inlet. In one example, one or more actions described with respect to blocks 2214 and/or 2216 may occur simultaneously. At block 2218 the propulsor fans are rotated to a final downward position to support a V/STOL flight mode.

Figure 23:
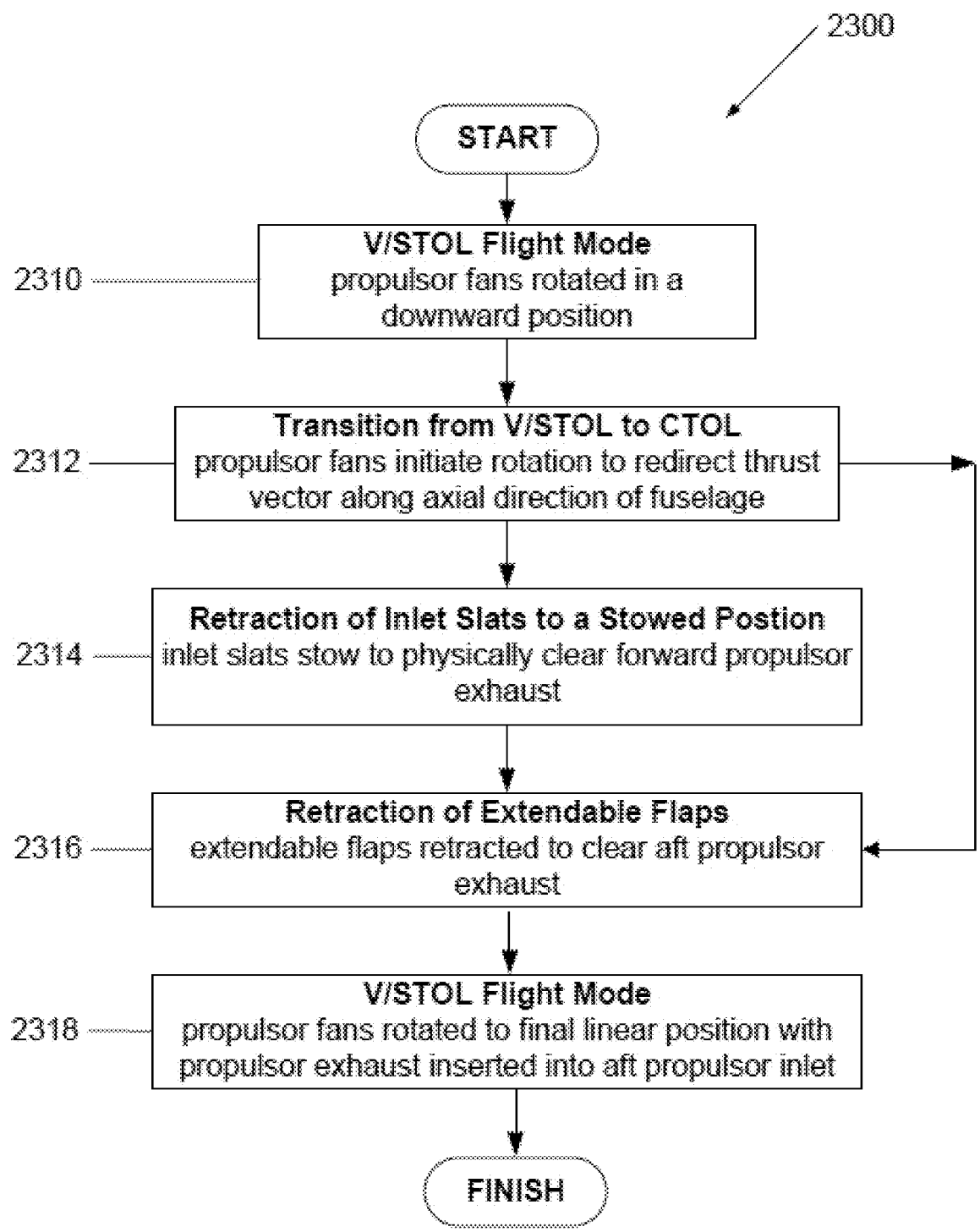
FIG. 23 depicts an example flow for controlling thrust direction when transitioning from V/STOL flight mode to a CTOL flight mode according to various aspects described herein.

As depicted in FIG. 23, the series of thrust-generating propulsor fans may also be rotated or articulated as shown in flowchart 2300 to redirect thrust to provide an aircraft the capability to transition from a V/STOL flight mode to a CTOL flight mode. At shown in example block 2310, an aircraft may be in a V/STOL flight mode with a series of propulsor rotated in a downward position, such as described above in one embodiment, in which the thrust vector may be at an angle above 35 degrees to an angle less than 105 degrees relative from the desired aircraft flight path in a CTOL flight mode. In yet other embodiments, at least a portion (or all) of the propulsors may be positioned between 40 and 100 degrees from the desired aircraft flight path in a CTOL flight mode. In yet further embodiments, at least a portion (or all) of the propulsors in a group may be positioned between 45-90 degrees relative to from the desired aircraft flight path in a CTOL flight mode. At block 2312, the aircraft begins a transition to a CTOL flight mode and the series of propulsor fans begin a rotation to redirect the thrust vector along an axial direction of the fuselage to accelerate to forward flight. At block 2314, if the propulsor fans are configured with inlet slats, the inlet slats begin to stow to reduce drag. The inlet flaps will retract to prevent physical contact of a forward propulsor fan exhaust/outlet during rotation of the propulsor fan. At block 2316, if the propulsor fans are configured with extendable flaps, the extended flaps will retract with propulsor fan rotation so as to not physically contact an aft positioned propulsor fan inlet. In one example, blocks 2314 and 2316 may occur simultaneously. At block 2318 the propulsor fans are rotated to a final linear position to support a CTOL flight mode. In one example, the propulsor fan outlets may abut or be inserted into the aft positioned propulsor fan inlets.

Figure 24:
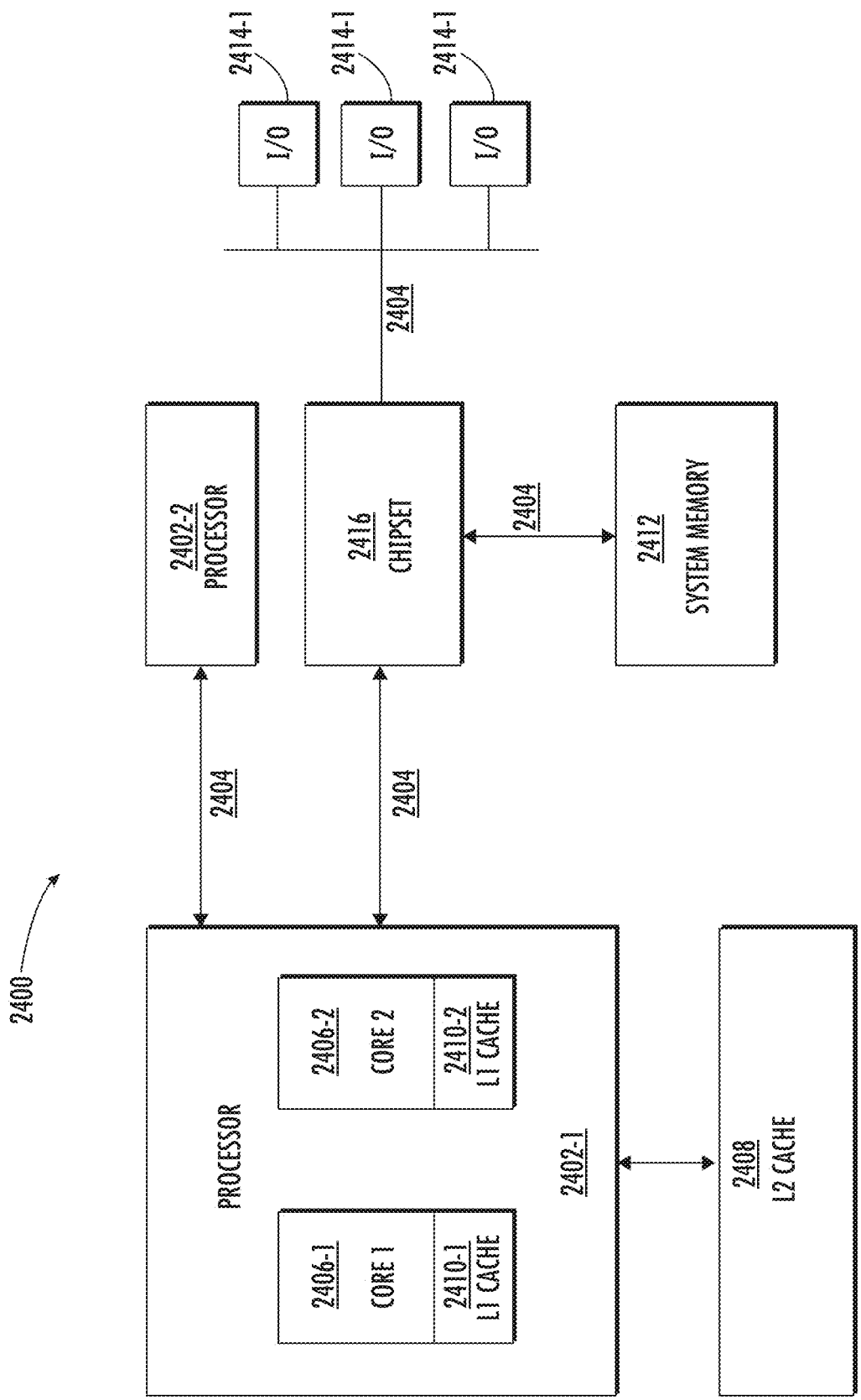
FIG. 24 illustrates an example flight control computer that may be part of or in communication with the aircraft and related systems of FIGS. 18A-18C.

Aspects of this disclosure further relate to one or more non-transitory computer-readable mediums that comprise computer-readable instructions that when executed by a processor, cause the processor to perform at least one or more functions as outlined herein, such as, but not limited to, positioning one or more propulsors to one or more positions and/or actuating aircraft control surfaces. FIG. 24 depicts one non-limiting example of a computer-readable medium according to certain embodiments. Specifically, FIG. 24 illustrates a block diagram of flight control computer 2400. Those skilled in the art will appreciate that the disclosure of FIG. 24 may be applicable to any system, aircraft. aircraft control system, or and/or propulsion system disclosed herein. Flight control computer 2400 may include one or more processors, such as processor 2402-1 and 2402-2 (generally referred to herein as "processors 2402" or "processor 2402"). Processors 2402 may communicate with each other or other components via an interconnection network or bus 2404. Processor 2402 may include one or more processing cores, such as cores 2406-1 and 2406-2 (referred to herein as "cores 2406" or more generally as "core 2406"), which may be implemented on a single integrated circuit (IC) chip. Although computer 2400 is shown on a single drawing, those of ordinary skill in the art with the benefit of this disclosure will appreciate that one or more components may be "remote" with respect to another component. For example, in one embodiment, one or more components may be in a separate housing from one or more other components. In some embodiments, one or more components of computer 2400 may only be in wireless communication with other components of computer 2400. In certain embodiments, one or more components of computer 2400 may be located on or within a portion of an aircraft, and yet other components may be located remote with respect to the aircraft.

In certain embodiments, positioning one or more propulsors, including any of the propulsors disclosed herein to a configuration or position may be based, at least in part, on one or more calculations, determinations, inputs, and or outputs of computer 2400. As non-limiting examples, configuration or position of one or more propulsors may be based on operational parameters such as the final angle that one or more propulsors are articulated to during a particular instance of implementing a positional configuration, whether one or more propulsors are articulated at a variable rate, the variable or constant rate implemented, a desired speed or acceleration along one or more directions (inclusive of a reduction of acceleration or velocity), weather parameters, including but not limited to wind direction or speed, weight or weight distribution of the craft or portion of the craft, amongst others.

Although the subject matter has been described in language specific to structural features and/or methodological acts, it is to be understood that the subject matter defined in any statement of examples is not necessarily limited to the specific features or acts described above. Furthermore, while aspects of the present disclosure have been described in terms of preferred examples, and it will be understood that the disclosure is not limited thereto since modifications may be made to those skilled in the art, particularly in light of the foregoing teachings. For example, although various examples are described herein, features and/or steps of those examples may be combined, divided, omitted, rearranged, revised, and/or augmented in any desired manner. Various alterations, modifications, and improvements will be appreciated by those skilled in the art and are intended to be part of this description, even if not expressly stated herein, and are intended to be within the spirit and scope of the disclosures herein. The disclosures herein, therefore, are by way of example only, and are not limiting.

What is claimed is:

1. An aircraft comprising:
   a fuselage;
   a main wing attached to the fuselage; and
   a plurality of propulsion systems configured to generate thrust, wherein each of the propulsion systems comprise a plurality of propulsor fans configured to rotate between a conventional take-off and landing (CTOL) flight mode, a short take-off and landing (STOL) flight mode, and a vertical take-off and a landing (VTOL) flight mode, and wherein a first propulsion system, of the plurality of propulsion systems, is vertically offset from a second propulsion system of the plurality of propulsion systems; and
   a non-transitory-computer readable medium comprising computer-executable instructions that, when executed by a processor, cause the processor to at least:
      receive a control signal configured to selectively actuate the plurality of propulsor fans such that each of the plurality of propulsor fans are actuated with a progressively steeper angle relative to a linear axis along a length of the fuselage, such that a downwind positioned propulsor fan is articulated to a greater angle than an upwind positioned propulsor fan angle when transitioning from the CTOL flight mode to one of either the STOL flight mode or the VTOL flight mode.

2. The aircraft of claim 1, wherein, during the STOL flight mode and the VTOL flight mode, no exhaust of any propulsor fan, of the plurality of propulsor fans, is aligned with an inlet of another propulsor fan of the plurality of propulsor fans.

3. The aircraft of claim 2, wherein, during the CTOL flight mode, the exhaust of at least one propulsor fan, of the plurality of propulsor fans, is aligned with the inlet of another propulsor fan of the plurality of propulsor fans.

4. The aircraft of claim 3, wherein during alignment, the exhaust of the at least one propulsor fan is inserted into the inlet of another propulsor fan of the plurality of propulsor fans.

5. The aircraft of claim 1, wherein at least one plurality of propulsor fans, of the plurality of propulsion systems, is attached to the main wing or the fuselage.

6. The aircraft of claim 1, wherein at least a rearmost propulsor fan of the plurality of propulsion systems comprises at least one of a variable nozzle or extendable flaps.

7. The aircraft of claim 1, wherein the plurality of propulsion systems comprises four propulsion systems:
the first system comprising four of the propulsor fans attached to a forward-left lower portion of the fuselage;
the second system comprising four of the propulsor fans attached to an aft-left upper portion of the fuselage;
a third system comprising four of the propulsor fans attached to a forward-right lower portion of the fuselage;
and
a fourth system comprising four of the propulsor fans attached to an aft-right upper portion of the fuselage.

* * * * *